United States Patent
Amano

(10) Patent No.: US 12,472,226 B2
(45) Date of Patent: Nov. 18, 2025

(54) CELL-PERMEABLE PEPTIDE

(71) Applicant: Shigeru Amano, Saitama (JP)

(72) Inventor: Shigeru Amano, Saitama (JP)

(*) Notice: Subject to any disclaimer, the term of this patent is extended or adjusted under 35 U.S.C. 154(b) by 804 days.

(21) Appl. No.: 17/621,178

(22) PCT Filed: Jun. 21, 2020

(86) PCT No.: PCT/JP2020/024273
§ 371 (c)(1),
(2) Date: Dec. 20, 2021

(87) PCT Pub. No.: WO2020/256150
PCT Pub. Date: Dec. 24, 2020

(65) Prior Publication Data
US 2023/0210940 A1    Jul. 6, 2023

(30) Foreign Application Priority Data
Jun. 21, 2019   (JP) ................ 2019-115222

(51) Int. Cl.
*A61K 38/16* (2006.01)
*A61K 47/64* (2017.01)
*A61P 35/00* (2006.01)
*C07K 14/00* (2006.01)
*C12N 15/11* (2006.01)

(52) U.S. Cl.
CPC .............. *A61K 38/16* (2013.01); *A61K 47/64* (2017.08); *A61P 35/00* (2018.01); *C07K 14/00* (2013.01); *C12N 15/11* (2013.01)

(58) Field of Classification Search
CPC ........ A61K 38/16; A61K 47/64; A61K 38/00; A61P 35/00; C07K 14/00; C12N 15/11
See application file for complete search history.

(56) References Cited

U.S. PATENT DOCUMENTS

| 8,636,978 B2 | 1/2014 | Wood et al. | |
| 2006/0153853 A1* | 7/2006 | Forbes | A61P 35/04 |
| | | | 435/325 |

FOREIGN PATENT DOCUMENTS

| JP | 2004-35955 A | 12/2004 | |
| KR | 10-2014-0126113 A | 10/2014 | |
| WO | WO-0023469 A2 * | 4/2000 | ......... C07K 14/4743 |
| WO | 2010/134537 A1 | 11/2012 | |
| WO | 2011/126010 A1 | 7/2013 | |

OTHER PUBLICATIONS

Jpred4, A protein secondary structure prediction server, accessed on Jan. 7, 2025, https://www.compbio.dundee.ac.uk/jpred4/ ).*
Weaver, How Taxol/paclitaxel Kills Cancer Cells, Mol Biol Cell, Sep. 15, 2014; 25(18): 2677-2681, US.
Moudi et al., Review on Vinca Alkaloids, Int J Prev Med, Nov. 2013; 4(11) 1231-1235, IN.
Rabik et al., Molecular Mechanisms of Resistance and Toxicity Associated with Platinating Agents, Cancer Treat Rev., Feb. 2007; 33(1): 9-23, NL.
Nascimento et al., A Review on (Hydro)Porphyrin-Loaded Polymer Micelles: Interesting and Valuable Platforms for Enhanced Cancer Nanotheragnostics, Pharmaceutics 2019; 11(2): 81, CH.
Heitz et al., Twenty years of cell-penetrating peptides: from molecular mechanisms to therapeutics, British J Pharmacology 157: 195-206 (2009), GB.
Jo et al., Cell-penetrating peptide (CPP)-conjugated proteins is an efficient tool for manipulation of human mesenchymal stromal cells, Scientific Reports 4: 4378 (2014).

* cited by examiner

*Primary Examiner* — Lianko G Garyu
*Assistant Examiner* — Erinne R Dabkowski
(74) *Attorney, Agent, or Firm* — Reichel Stohry Dean LLP; Natalie J. Dean

(57) ABSTRACT

[Problem] Provided is a cell-penetrating peptide having higher selective toxicity to target cells. Also, provided is a cell-penetrating peptide as an activator delivery carrier.

[Solution] An isolated cell-penetrating peptide comprises a motif selected from the group consisting of RGN, RGH, RYN, LYN, FFN and QYN and a motif selected from the group consisting of NGR and SEQ ID NOs: 44 and 45 and has a β-strand structure between the respective motifs.

6 Claims, 5 Drawing Sheets
Specification includes a Sequence Listing.

FIGURES 2B-E
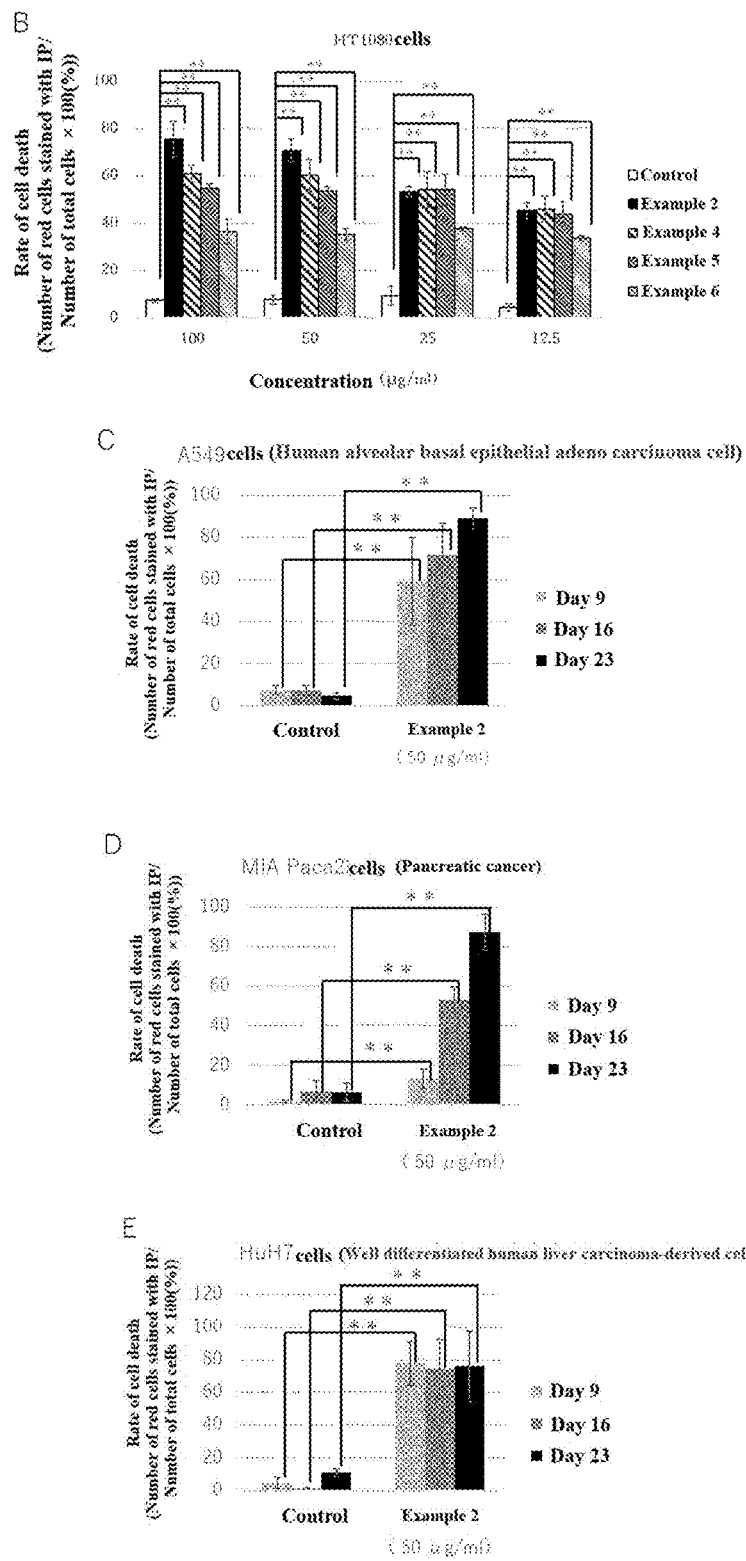

FIGURES 5A-B

```
SEQUENCE LISTING

<160> NUMBER OF SEQ ID NOS: 45

<210> SEQ ID NO 1
<211> LENGTH: 22
<212> TYPE: PRT
<213> ORGANISM: Artificial Sequence
<220> FEATURE:
<223> OTHER INFORMATION: This is derived from a part of CD ligand.
<220> FEATURE:
<221> NAME/KEY: BINDING
<222> LOCATION: (3)..(6)
<220> FEATURE:
<221> NAME/KEY: BINDING
<222> LOCATION: (13)..(17)

<400> SEQUENCE: 1

Lys Asp Asn Arg Gly Asn Leu Leu Gln Cys Val Cys Thr Gly Asn Gly
1               5                   10                  15

Arg Gly Glu Trp Lys Cys
            20

<210> SEQ ID NO 2
<211> LENGTH: 22
<212> TYPE: PRT
<213> ORGANISM: Artificial Sequence
<220> FEATURE:
<223> OTHER INFORMATION: Fractioned and purified peptide derived from a
      part of CD ligand.
<220> FEATURE:
<221> NAME/KEY: BINDING
<222> LOCATION: (3)..(6)
<220> FEATURE:
<221> NAME/KEY: BINDING
<222> LOCATION: (13)..(17)

<400> SEQUENCE: 2

Lys Asp Asn Arg Gly Asn Leu Leu Gln Cys Ile Cys Thr Gly Asn Gly
1               5                   10                  15

Arg Gly Glu Trp Lys Cys
            20

<210> SEQ ID NO 3
<211> LENGTH: 22
<212> TYPE: PRT
<213> ORGANISM: Artificial Sequence
<220> FEATURE:
<223> OTHER INFORMATION: Peptide derived from a part of CD ligand.
<220> FEATURE:
<221> NAME/KEY: BINDING
<222> LOCATION: (3)..(6)
<220> FEATURE:
<221> NAME/KEY: BINDING
<222> LOCATION: (13)..(17)

<400> SEQUENCE: 3

Thr Asp Thr Arg Gly Asn Leu Leu Gln Cys Ile Cys Thr Gly Asn Gly
1               5                   10                  15

Arg Gly Glu Trp Lys Cys
            20
```

```
<210> SEQ ID NO 4
<211> LENGTH: 23
<212> TYPE: PRT
<213> ORGANISM: Artificial Sequence
<220> FEATURE:
<223> OTHER INFORMATION: Peptide derived from a part of CD ligand.
<220> FEATURE:
<221> NAME/KEY: BINDING
<222> LOCATION: (3)..(6)
<220> FEATURE:
<221> NAME/KEY: BINDING
<222> LOCATION: (14)..(18)

<400> SEQUENCE: 4

Lys Thr Asp Ser Arg Gly His Val Leu Gln Cys Leu Cys Thr Gly Asn
1               5                   10                  15

Gly Arg Gly Glu Trp Lys Cys
            20

<210> SEQ ID NO 5
<211> LENGTH: 23
<212> TYPE: PRT
<213> ORGANISM: Artificial Sequence
<220> FEATURE:
<223> OTHER INFORMATION: Peptide derived from a part of CD ligand.
<220> FEATURE:
<221> NAME/KEY: BINDING
<222> LOCATION: (3)..(6)
<220> FEATURE:
<221> NAME/KEY: BINDING
<222> LOCATION: (13)..(19)

<400> SEQUENCE: 5

Lys His Gly Arg Tyr Asn Leu Lys Gln Cys Lys Met Ser Leu Asn Gly
1               5                   10                  15

Gln Arg Gly Glu Cys Trp Cys
            20

<210> SEQ ID NO 6
<211> LENGTH: 23
<212> TYPE: PRT
<213> ORGANISM: Artificial Sequence
<220> FEATURE:
<223> OTHER INFORMATION: Peptide derived from a part of CD ligand.
<220> FEATURE:
<221> NAME/KEY: BINDING
<222> LOCATION: (4)..(5)
<220> FEATURE:
<221> NAME/KEY: BINDING
<222> LOCATION: (13)..(19)

<400> SEQUENCE: 6

Lys His Gly Leu Tyr Asn Leu Lys Gln Cys Lys Met Ser Leu Asn Gly
1               5                   10                  15

Gln Arg Gly Glu Cys Trp Cys
            20

<210> SEQ ID NO 7
<211> LENGTH: 23
<212> TYPE: PRT
<213> ORGANISM: Artificial Sequence
<220> FEATURE:
<223> OTHER INFORMATION: Peptide derived from a part of CD ligand.
<220> FEATURE:
<221> NAME/KEY: BINDING
<222> LOCATION: (4)..(5)
<220> FEATURE:
<221> NAME/KEY: BINDING
<222> LOCATION: (13)..(19)
```

```
<400> SEQUENCE: 7

Lys His Gly Leu Tyr Asn Leu Lys Gln Cys Lys Met Ser Val Asn Gly
1               5                   10                  15

Gln Arg Gly Glu Cys Trp Cys
            20

<210> SEQ ID NO 8
<211> LENGTH: 23
<212> TYPE: PRT
<213> ORGANISM: Artificial Sequence
<220> FEATURE:
<223> OTHER INFORMATION: Peptide derived from a part of CD ligand.
<220> FEATURE:
<221> NAME/KEY: BINDING
<222> LOCATION: (3)..(6)
<220> FEATURE:
<221> NAME/KEY: BINDING
<222> LOCATION: (13)..(19)

<400> SEQUENCE: 8

Lys Asn Gly Phe Phe Asn Leu Lys Gln Cys Lys Met Ser Val Asn Gly
1               5                   10                  15

Gln Arg Gly Glu Cys Trp Cys
            20

<210> SEQ ID NO 9
<211> LENGTH: 23
<212> TYPE: PRT
<213> ORGANISM: Artificial Sequence
<220> FEATURE:
<223> OTHER INFORMATION: Peptide derived from a part of CD ligand.
<220> FEATURE:
<221> NAME/KEY: BINDING
<222> LOCATION: (3)..(6)
<220> FEATURE:
<221> NAME/KEY: BINDING
<222> LOCATION: (14)..(17)

<400> SEQUENCE: 9

Lys Arg Gly Gln Tyr Asn Leu Lys Gln Cys Lys Met Ser Val Asn Gly
1               5                   10                  15

Tyr Arg Gly Glu Cys Trp Cys
            20

<210> SEQ ID NO 10
<211> LENGTH: 5
<212> TYPE: PRT
<213> ORGANISM: Artificial Sequence
<220> FEATURE:
<223> OTHER INFORMATION: A part of the binding site

<400> SEQUENCE: 10

Thr Gly Asn Gly Arg
1               5

<210> SEQ ID NO 11
<211> LENGTH: 7
<212> TYPE: PRT
<213> ORGANISM: Artificial Sequence
<220> FEATURE:
<223> OTHER INFORMATION: A part of the binding site

<400> SEQUENCE: 11

Ser Leu Asn Gly Gln Arg Gly
1               5
```

```
<210> SEQ ID NO 12
<211> LENGTH: 7
<212> TYPE: PRT
<213> ORGANISM: Artificial Sequence
<220> FEATURE:
<223> OTHER INFORMATION: A part of the binding site

<400> SEQUENCE: 12

Ser Val Asn Gly Gln Arg Gly
1               5

<210> SEQ ID NO 13
<211> LENGTH: 4
<212> TYPE: PRT
<213> ORGANISM: Artificial Sequence
<220> FEATURE:
<223> OTHER INFORMATION: A part of the binding site

<400> SEQUENCE: 13

Val Asn Gly Tyr
1

<210> SEQ ID NO 14
<211> LENGTH: 4
<212> TYPE: PRT
<213> ORGANISM: Artificial Sequence
<220> FEATURE:
<223> OTHER INFORMATION: A part of the binding site

<400> SEQUENCE: 14

Asn Arg Gly Asn
1

<210> SEQ ID NO 15
<211> LENGTH: 4
<212> TYPE: PRT
<213> ORGANISM: Artificial Sequence
<220> FEATURE:
<223> OTHER INFORMATION: A part of the binding site

<400> SEQUENCE: 15

Thr Arg Gly Asn
1

<210> SEQ ID NO 16
<211> LENGTH: 4
<212> TYPE: PRT
<213> ORGANISM: Artificial Sequence
<220> FEATURE:
<223> OTHER INFORMATION: A part of the binding site

<400> SEQUENCE: 16

Asp Ser Arg Gly
1

<210> SEQ ID NO 17
<211> LENGTH: 4
<212> TYPE: PRT
<213> ORGANISM: Artificial Sequence
<220> FEATURE:
<223> OTHER INFORMATION: A part of the binding site

<400> SEQUENCE: 17

Gly Phe Phe Asn
1
```

-continued

```
<210> SEQ ID NO 18
<211> LENGTH: 4
<212> TYPE: PRT
<213> ORGANISM: Artificial Sequence
<220> FEATURE:
<223> OTHER INFORMATION: A part of the binding site

<400> SEQUENCE: 18

Gly Arg Tyr Asn
1

<210> SEQ ID NO 19
<211> LENGTH: 4
<212> TYPE: PRT
<213> ORGANISM: Artificial Sequence
<220> FEATURE:
<223> OTHER INFORMATION: A part of the binding site

<400> SEQUENCE: 19

Gly Gln Tyr Asn
1

<210> SEQ ID NO 20
<211> LENGTH: 6
<212> TYPE: PRT
<213> ORGANISM: Artificial Sequence
<220> FEATURE:
<223> OTHER INFORMATION: A part of the binding site

<400> SEQUENCE: 20

Leu Leu Gln Cys Val Cys
1               5

<210> SEQ ID NO 21
<211> LENGTH: 6
<212> TYPE: PRT
<213> ORGANISM: Artificial Sequence
<220> FEATURE:
<223> OTHER INFORMATION: A part of the binding site

<400> SEQUENCE: 21

Leu Leu Gln Cys Ile Cys
1               5

<210> SEQ ID NO 22
<211> LENGTH: 7
<212> TYPE: PRT
<213> ORGANISM: Artificial Sequence
<220> FEATURE:
<223> OTHER INFORMATION: A part of the binding site

<400> SEQUENCE: 22

His Val Leu Gln Cys Leu Cys
1               5

<210> SEQ ID NO 23
<211> LENGTH: 7
<212> TYPE: PRT
<213> ORGANISM: Artificial Sequence
<220> FEATURE:
<223> OTHER INFORMATION: A part of the binding site

<400> SEQUENCE: 23

Asn Leu Lys Gln Cys Lys Met
1               5

<210> SEQ ID NO 24
```

```
<211> LENGTH: 6
<212> TYPE: PRT
<213> ORGANISM: Artificial Sequence
<220> FEATURE:
<223> OTHER INFORMATION: A part of the binding site

<400> SEQUENCE: 24

Leu Lys Gln Cys Lys Met
1               5

<210> SEQ ID NO 25
<211> LENGTH: 7
<212> TYPE: PRT
<213> ORGANISM: Artificial Sequence
<220> FEATURE:
<223> OTHER INFORMATION: A part of the binding site

<400> SEQUENCE: 25

Leu Lys Gln Cys Lys Met Ser
1               5

<210> SEQ ID NO 26
<211> LENGTH: 5
<212> TYPE: PRT
<213> ORGANISM: Artificial Sequence
<220> FEATURE:
<223> OTHER INFORMATION: A part of the random coil

<400> SEQUENCE: 26

Gly Glu Trp Lys Cys
1               5

<210> SEQ ID NO 27
<211> LENGTH: 4
<212> TYPE: PRT
<213> ORGANISM: Artificial Sequence
<220> FEATURE:
<223> OTHER INFORMATION: A part of the random coil

<400> SEQUENCE: 27

Glu Cys Trp Cys
1

<210> SEQ ID NO 28
<211> LENGTH: 6
<212> TYPE: PRT
<213> ORGANISM: Artificial Sequence
<220> FEATURE:
<223> OTHER INFORMATION: A part of the random coil

<400> SEQUENCE: 28

Arg Gly Glu Cys Trp Cys
1               5

<210> SEQ ID NO 29
<211> LENGTH: 13
<212> TYPE: PRT
<213> ORGANISM: Artificial Sequence
<220> FEATURE:
<223> OTHER INFORMATION: Full length peptide

<400> SEQUENCE: 29

Cys Val Cys Thr Gly Asn Gly Arg Gly Glu Trp Lys Cys
1               5                   10

<210> SEQ ID NO 30
<211> LENGTH: 7
```

```
<212> TYPE: PRT
<213> ORGANISM: Artificial Sequence
<220> FEATURE:
<223> OTHER INFORMATION: Full length peptide

<400> SEQUENCE: 30

Gly Asn Gly Arg Gly Glu Trp
1               5

<210> SEQ ID NO 31
<211> LENGTH: 5
<212> TYPE: PRT
<213> ORGANISM: Artificial Sequence
<220> FEATURE:
<223> OTHER INFORMATION: Full length peptide
<220> FEATURE:
<221> NAME/KEY: MISC_FEATURE
<222> LOCATION: (1)..(5)
<223> OTHER INFORMATION: Disulfide bond

<400> SEQUENCE: 31

Cys Asn Gly Arg Cys
1               5

<210> SEQ ID NO 32
<211> LENGTH: 23
<212> TYPE: PRT
<213> ORGANISM: Artificial Sequence
<220> FEATURE:
<223> OTHER INFORMATION: This is derived from a part of CD ligand.
<220> FEATURE:
<221> NAME/KEY: MISC_FEATURE
<222> LOCATION: (1)..(1)
<223> OTHER INFORMATION: X is Ahx.

<400> SEQUENCE: 32

Xaa Lys Asp Asn Arg Gly Asn Leu Leu Gln Cys Val Cys Thr Gly Asn
1               5                   10                  15

Gly Arg Gly Glu Trp Lys Cys
            20

<210> SEQ ID NO 33
<211> LENGTH: 22
<212> TYPE: PRT
<213> ORGANISM: Artificial Sequence
<220> FEATURE:
<223> OTHER INFORMATION: This is derived from a part of CD ligand.

<400> SEQUENCE: 33

Lys Asp Asn Arg Gly Asn Leu Leu Gln Cys Val Cys Thr Gly Asn Gly
1               5                   10                  15

Arg Gly Glu Trp Lys Cys
            20

<210> SEQ ID NO 34
<211> LENGTH: 22
<212> TYPE: PRT
<213> ORGANISM: Artificial Sequence
<220> FEATURE:
<223> OTHER INFORMATION: This is derived from a part of CD ligand.
<220> FEATURE:
<221> NAME/KEY: BINDING
<222> LOCATION: (3)..(6)
<220> FEATURE:
<221> NAME/KEY: BINDING
<222> LOCATION: (13)..(17)

<400> SEQUENCE: 34
```

```
Lys Asp Asn Arg Gly Asn Leu Leu Gln Cys Leu Cys Thr Gly Asn Gly
1               5                   10                  15

Arg Gly Glu Trp Lys Cys
            20

<210> SEQ ID NO 35
<211> LENGTH: 23
<212> TYPE: PRT
<213> ORGANISM: Artificial Sequence
<220> FEATURE:
<223> OTHER INFORMATION: This is derived from a part of CD ligand.
<220> FEATURE:
<221> NAME/KEY: MISC_FEATURE
<222> LOCATION: (1)..(1)
<223> OTHER INFORMATION: X is Ahx.

<400> SEQUENCE: 35

Xaa Lys Asp Asn Arg Gly Asn Leu Leu Gln Cys Leu Cys Thr Gly Asn
1               5                   10                  15

Gly Arg Gly Glu Trp Lys Cys
            20

<210> SEQ ID NO 36
<211> LENGTH: 23
<212> TYPE: PRT
<213> ORGANISM: Artificial Sequence
<220> FEATURE:
<223> OTHER INFORMATION: This is derived from a part of CD ligand.
<220> FEATURE:
<221> NAME/KEY: MISC_FEATURE
<222> LOCATION: (1)..(1)
<223> OTHER INFORMATION: X is Ahx.

<400> SEQUENCE: 36

Xaa Lys Asp Asn Arg Gly Asn Leu Leu Gln Cys Ile Cys Thr Gly Asn
1               5                   10                  15

Gly Arg Gly Glu Trp Lys Cys
            20

<210> SEQ ID NO 37
<211> LENGTH: 24
<212> TYPE: PRT
<213> ORGANISM: Artificial Sequence
<220> FEATURE:
<223> OTHER INFORMATION: This is derived from a part of CD ligand.
<220> FEATURE:
<221> NAME/KEY: MISC_FEATURE
<222> LOCATION: (1)..(1)
<223> OTHER INFORMATION: X is Ahx.

<400> SEQUENCE: 37

Xaa Lys His Gly Leu Tyr Asn Leu Lys Gln Cys Lys Met Ser Leu Asn
1               5                   10                  15

Gly Gln Arg Gly Glu Cys Trp Cys
            20

<210> SEQ ID NO 38
<211> LENGTH: 6
<212> TYPE: PRT
<213> ORGANISM: Artificial Sequence
<220> FEATURE:
<223> OTHER INFORMATION: A part of the binding site

<400> SEQUENCE: 38

Leu Leu Gln Cys Leu Cys
1               5
```

<210> SEQ ID NO 39
<211> LENGTH: 6
<212> TYPE: PRT
<213> ORGANISM: Artificial Sequence
<220> FEATURE:
<223> OTHER INFORMATION: A part of the binding site

<400> SEQUENCE: 39

Val Asn Gly Tyr Arg Gly
1               5

<210> SEQ ID NO 40
<211> LENGTH: 5
<212> TYPE: PRT
<213> ORGANISM: Artificial Sequence
<220> FEATURE:
<223> OTHER INFORMATION: A part of the binding site

<400> SEQUENCE: 40

Asp Ser Arg Gly His
1               5

<210> SEQ ID NO 41
<211> LENGTH: 4
<212> TYPE: PRT
<213> ORGANISM: Artificial Sequence
<220> FEATURE:
<223> OTHER INFORMATION: A part of the binding site

<400> SEQUENCE: 41

Gly Leu Tyr Asn
1

<210> SEQ ID NO 42
<211> LENGTH: 6
<212> TYPE: PRT
<213> ORGANISM: Artificial Sequence
<220> FEATURE:
<223> OTHER INFORMATION: A part of the binding site

<400> SEQUENCE: 42

Val Leu Gln Cys Leu Cys
1               5

<210> SEQ ID NO 43
<211> LENGTH: 5
<212> TYPE: PRT
<213> ORGANISM: Artificial Sequence
<220> FEATURE:
<223> OTHER INFORMATION: A part of the random coil

<400> SEQUENCE: 43

Gly Glu Cys Trp Cys
1               5

<210> SEQ ID NO 44
<211> LENGTH: 4
<212> TYPE: PRT
<213> ORGANISM: Artificial Sequence
<220> FEATURE:
<223> OTHER INFORMATION: A part of the binding site
<220> FEATURE:
<221> NAME/KEY: BINDING
<222> LOCATION: (1)..(4)

<400> SEQUENCE: 44

Asn Gly Gln Arg

```
<210> SEQ ID NO 45
<211> LENGTH: 4
<212> TYPE: PRT
<213> ORGANISM: Artificial Sequence
<220> FEATURE:
<223> OTHER INFORMATION: A part of the binding site
<220> FEATURE:
<221> NAME/KEY: BINDING
<222> LOCATION: (1)..(4)

<400> SEQUENCE: 45

Asn Gly Tyr Arg
1
```

CELL-PERMEABLE PEPTIDE

PRIORITY

This application is related to, claims the priority benefit of, and is a 35 U.S.C. 371 national stage application of International Patent Application No. PCT/JP2020/024273 filed Jun. 21, 2020, which claims all benefit, including priority to, Japanese Patent Application No. 2019-115222 filed Jun. 21, 2019. The entire contents of each of the aforementioned priority applications are hereby expressly incorporated herein by reference in their entireties.

TECHNICAL FIELD

The present invention relates to peptides and in particular cell-penetrating peptides or delivery carriers.

STATEMENT OF THE SEQUENCE LISTING

The contents of the electronic sequence listing (D2021-58-USSeqListing_ST25.txt; file size: 11,774 bytes; date of creation: Oct. 11, 2022) is herein incorporated by reference in its entirety. The content of the computer-readable form referenced above is the same as, and the information recorded in computer readable form is identical to, the written sequence listings provided herein.

BACKGROUND ART

In recent years, countermeasures against cancer have been hurriedly and various anticancer agents for the needs have been developed and produced remarkable effects.

For example, taxane-based compounds such as paclitaxel and docetaxel that bind to a microtubule, stabilize the microtubule and inhibit depolymerization to inhibit division of tumor cells, *vinca* alkaloid-based compounds such as vincristine and vinblastine that inhibit polymerization of microtubule to stop cell division and the like are known. Platinum-based drugs such as cisplatin, carboplatin, nedaplatin and oxaliplatin that bind to DNA to exert anticancer effects can be easily used for injection or intravenous drip infusion (Non-Patent Literatures 1 to 3).

Further, the development of a micelle composite encapsulating a medicine such as an anticancer agent therein, an anticancer agent encapsulated in a liposome and the like has proceeded using a drug delivery system (DDS) to enhance the action and effect of the anticancer agents (Non-patent Literature 4). Also, there is a report in which it causes a fused polypeptide anticancer agent to be able to target to cancer cells efficiently that an NGR motif binds to a glycoprotein (Patent Literature 1).

CITATION LIST

Patent Literature

Patent Literature 1: U.S. Pat. No. 8,636,978

Non-Patent Literature

Non-Patent Literature 1: Beth A. Weaver, How Taxol/paclitaxel kills cancer cells. Mol Biol Cell. 2014 Sep. 15; 25(18): 2677-2681.
Non-Patent Literature 2: Maryam Moudi et al, Int J Prev Med. 2013 November; 4(11): 1231-1235.
Non-Patent Literature 3: Cara A. Rabik et al, Molecular Mechanisms of Resistance and Toxicity Associated with Platinating Agents. Cancer Treat Rev. 2007 February; 33(1): 9-23.
Non-Patent Literature 4: Bruno F. O. Nascimento et al, A Review on (Hydro)Porphyrin-Loaded Polymer Micelles: Interesting and Valuable Platforms for Enhanced Cancer Nanotheranostics Pharmaceutics 2019, 11(2), 81.

SUMMARY OF INVENTION

Technical Problem

Now activators such as all compounds for an anticancer agent face a problem of selective toxicity, that is, influence on normal cells. It is inevitable that the aforementioned platinum-based agents also have a problem with nephrotoxicity. Furthermore, even the anticancer agents using DDS have an inescapable problem of cellular toxicity. Therefore, one of the significant problems is how to act on only target cells with a drug such as an anticancer agent or activator. For a serious disease such as cancer, various treatment options in accordance with the disease condition or state of a patient having the illness are to be provided. Accordingly, it is an object of the present invention to provide the cell-penetrating peptides having higher selective toxicity to target cells (specifically acting on the target cells). Also, it is the object of the present invention to provide the cell-penetrating peptides as an activator delivery carrier.

Solution to Problem

The inventor of the present invention has continued a diligent research in order to solve the above-described problems, and discovered an unique motif intended for binding on the basis of an inspiration that another motif is also intended for binding to the cell surface in consideration of the structural matter by the NGR motif of a ligand molecule binding to a cell surface. Then, the present inventor has found out the interesting fact that the apoptosis was induced after the peptides having the above-described unique motif was incorporated into cytoplasm and transferred to a nucleus, further advanced the research, and then completed the present invention. In other words, the present invention relates to the followings.

(1) An isolated cell-penetrating peptide including a motif selected from the group consisting of RGN, RGH, RYN, LYN, FFN and QYN and a motif selected from the group consisting of NGR and SEQ ID NOs: 44 and 45 and having a β-strand structure between the respective motifs.

(2) The cell-penetrating peptide according to (1), the cell-penetrating peptide specifically binding to a glycoprotein.

(3) The cell-penetrating peptide according to (1) or (2), the cell-penetrating peptide having a full length of 40 amino acids or less.

(4) The cell-penetrating peptide according to any one of (1) to (3), the cell-penetrating peptide having an amino acid sequence having at least 80% sequence identity to an amino acid sequence selected from the group consisting of SEQ ID NOs: 1, 34, 2, 3, 4, 5, 6, 7, 8 and 9.

(5) The cell-penetrating peptide according to any one of (1) to (4), the cell-penetrating peptide having an amino acid sequence selected from the group consisting of SEQ ID NOs: 1, 34, 2, 3, 4, 5, 6, 7, 8 and 9.

(6) A pharmaceutical composition for treatment or prevention of cancer containing the cell-penetrating peptide as an active ingredient according to any one of (1) to (5).

(7) A pharmaceutical composition for treatment or prevention of cancer containing the cell-penetrating peptide as a delivery carrier for an agent in nucleus according to any one of (1) to (5).

(8) The pharmaceutical composition according to (6) or (7), wherein the agent binds to an N-terminus and/or C-terminus of the cell-penetrating peptide.

(9) The pharmaceutical composition according to (8), wherein the agent is selected from the group consisting of doxorubicin, mitomycin C, vindesine, methotrexate, retinoic acid, carboplatin, nedaplatin, oxaliplatin, epirubicin, actinomycin D, gemcitabine and oteracil potassium.

(10) The pharmaceutical composition according to any one of (6) to (9), wherein the cancer is epithelial cancer or carcinoma, nonepithelial cancer or sarcoma or blood cancer.

(11) The pharmaceutical composition according to (10), wherein the cancer is selected from the group consisting of lung cancer, gastric cancer, gallbladder and bile duct cancer, pancreatic cancer, liver cancer, colon cancer, rectal cancer, breast cancer, osteosarcoma, liposarcoma, angiosarcoma, rhabdomyosarcoma, leiomyosarcoma, acute myeloid leukemia, acute lymphocytic leukemia, acute promyelocytic leukemia, chronic myeloid leukemia, chronic lymphocytic leukemia, malignant lymphoma and multiple myeloma.

Effects of Invention

Cell-penetrating peptides of the present invention can not only pass the cell membrane simply but also penetrate the cell membrane via a cell membrane receptor and transfer to cytoplasm. Besides that, the cell-penetrating peptides can transfer to a nucleus. Further, having little influence on normal cells and inducing the apoptosis of the target cells to suppress and diminish the tumors and the like, the cell-penetrating peptides having higher selective toxicity (specifically acting on target cells) can be provided. The cell-penetrating peptides as an activator delivery carrier into the cell nucleus can also be provided.

BRIEF DESCRIPTION OF DRAWINGS

FIGS. 2B to E are graphs illustrating a cell-death inducing action of Examples on cancer cells.

DESCRIPTION OF EMBODIMENTS

Figure 1:
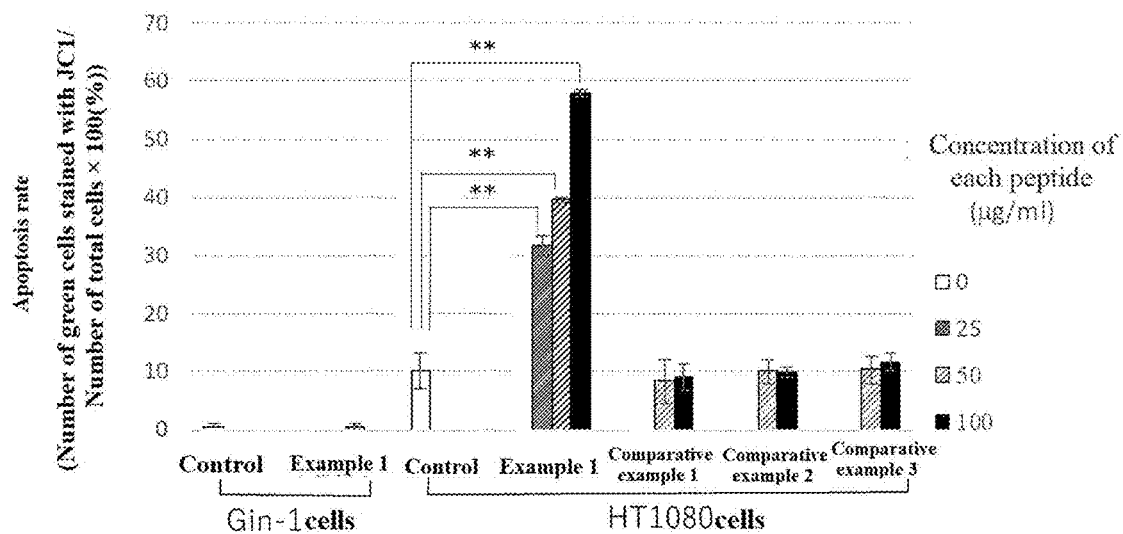
FIG. 1 is a graph illustrating an apoptosis-inducing action of Example 1 on normal cells and cancer cells.

Unless otherwise defined herein, all technical and scientific terms used herein have the same meaning as commonly understood by those skilled in the art to which the present invention belongs. Although any methods and materials similar or equivalent to those described herein found use in the practice of the present invention, some suitable methods and materials are described herein. It is to be understood that the present invention is not limited to particular methods, protocols and reagents described as they may be changed depending on the context in which they are used by those skilled in the art. Also, unless otherwise especially noted, amino acids are written left to right in orientation of an amino group terminus (N terminus) to a carboxyl group terminus (C terminus).

Throughout this disclosure, unless the context requires otherwise, the words "comprise", "comprises" and "comprising" will be understood to imply the inclusion of a stated step or element or group of steps or elements but not the exclusion of any other step or element or group of steps or elements.

It must be noted that, as used in this specification, the singular forms "a", "an" and "the" include plural referents unless the content clearly dictates otherwise.

The terms "peptide", "oligopeptide", "polypeptide" and "protein" used are used interchangeably herein to refer to a polymer of at least two amino acid residues linked by a peptide bond(s). This term does not connote a certain length of polymer, nor is it intended to imply or distinguish whether the peptide is produced using recombination techniques, chemical or enzymatic synthesis, a naturally occurring or isolated.

The term "amino acid" used herein, in its broadest sense, refers to any compound and/or substance that can be incorporated into a peptide, oligopeptide, polypeptide or protein. In some embodiments, an amino acid has a generic structure: $H_2N$—$C(H)(R)$—$COOH$. In some embodiments, an amino acid is a naturally occurring amino acid, synthetic amino acid, D-amino acid or L-amino acid.

The term "cell-penetrating peptide (CPP)" used herein is interchangeably used and also called "transit peptide" or "carrier peptide". Cell-penetrating peptides refer to a peptide chain of a varying length that is known or can be proved to have the ability to cross the cell membrane of cells that can elicit a biological response or affect it's function, and invade or enter the cells without limitation.

The term "motif" used herein refers to a peptide that can be recognized by a receptor molecule of a particular cell or has a particular structure or function.

In a first embodiment, the present invention is an isolated cell-penetrating peptide comprising a first motif selected from the group consisting of RGN (Arg-Gly-Asn), RGH (Arg-Gly-His), RYN (Arg-Tyr-Asn), LYN (Leu-Tyr-Asn), FFN (Phe-Phe-Asn) and QYN (Gln-Tyr-Asn) and a second motif selected from the group consisting of NGR (Asn-Gly-Arg), NGQR (Asn-Gly-Gln-Arg) (SEQ ID NO: 44) and NGYR (Asn-Gly-Tyr-Arg) (SEQ ID NO: 45) and having a β-strand structure between the first and second motifs. Also, the present invention is an isolated cell-penetrating peptide comprising a motif represented by RGN (Arg-Gly-Asn) or LYN (Leu-Tyr-Asn) and a motif represented by NGR (Asn-Gly-Arg) or SEQ ID NO: 44 and having a β-strand structure between the motifs. Further, the present invention is an isolated cell-penetrating peptide comprising an RGN (Arg-Gly-Asn) motif and NGR (Asn-Gly-Arg) motif and having a β-strand structure between the RGN motif and the NGR motif. In one embodiment, the first or second motif may have an ability of specifically binding to a glycoprotein or receptor on cell membrane and be an amino acid sequence constituting, for example, β-turn structure.

In some embodiments of the present invention, the amino acid sequences constituting a β-turn structure may be a peptide having SEQ ID NOs: 10, 11, 12, 13, 14, 15, 16, 17, 18, 19, 39, 40, 41, 44, 45, LYN (Leu-Tyr-Asn) or LY (Leu-Tyr) without limitation. The amino acid sequences constituting a β-strand structure may have an ability to be specifically interacted with proteins into cytoplasm or nucleus of target cells and be a peptide having, without limitation, SEQ ID NOs: 20, 21, 22, 23, 24, 25, 38 or 42.

According to some embodiments, a random coil structure may be further added to an N-terminus or C-terminus. Amino acid sequences constituting the random coil structure may be an amino acid sequence that enhances hydrophilicity. Amino acid sequences of N-terminus, may be, for example, a peptide having KD (Lys-Asp), TD (Thr-Asp), KT (Lys-Thr), KH (Lys-His), KR (Lys-Arg), KN (Lys-Asn) or KHG (Lys-His-Gly) without limitation. Amino acid sequences of C-terminus may be a peptide having SEQ ID NOs: 26, 27, 28 or 43.

According to some embodiments of the present invention, the full length of cell-penetrating peptide may be 40 amino acids or less. In some embodiments, the full length of cell-penetrating peptide may be a peptide of 20, 21, 22, 23, 24, 25, 26, 27, 28, 29, 30, 31, 32 (with a fluorescein isothiocyanate (FITC) sequence added to the N-terminus thereof), 33 (with a doxorubicin (Dox)-PEG$_5$-dibenzylcyclooctyne (DBCO)-azide-PEG$_4$ sequence added to the N-terminus thereof), 34, 35 (with a FITC sequence added to the N-terminus thereof), 36 (with a FITC sequence added to the N-terminus thereof), 37 (with a FITC sequence added to the 5' end thereof), 38, 39 or 40 amino acid residues or less. The cell-penetrating peptide may optionally have an amino acid sequence including fragments in which 1, 2, 3, 4 or 5 amino acids are substituted, deleted and/or added or sequence variants of such fragment without suppressing the ability of cell-penetrating of the cell-penetrating peptide. Deletion of amino acids, substitution with other amino acids or addition in the cell-penetrating peptide may also occur each independently or simultaneously.

In one embodiment, the cell-penetrating peptides may be an isolated cell-penetrating peptide having an amino acid sequence selected from the group consisting of
KDNRGNLLQCVCTGNGRGEWKC (SEQ ID NO: 1),
KDNRGNLLQCICTGNGRGEWKC (SEQ ID NO: 2),
TDTRGNLLQCICTGNGRGEWKC (SEQ ID NO: 3),
KTDSRGHVLQCLCTGNGRGEWKC (SEQ ID NO: 4),
KHGRYNLKQCKMSLNGQRGECWC (SEQ ID NO: 5),
KHGLYNLKQCKMSLNGQRGECWC (SEQ ID NO: 6),
KHGLYNLKQCKMSVNGQRGECWC (SEQ ID NO: 7),
KNGFFNLKQCKMSVNGQRGECWC (SEQ ID NO: 8),
KRGQYNLKQCKMSVNGYRGECWC (SEQ ID NO: 9) and
KDNRGNLLQCLCTGNGRGEWKC (SEQ ID NO: 34)
without limitation. In one embodiment, the cell-penetrating peptide can include an amino acid sequence having at least 80, 81, 82, 83, 84, 85, 86, 87, 88, 89, 90, 91, 92, 93, 94, 95, 96, 97, 98 or 99% sequence identity to an amino acid sequence selected from the group consisting of SEQ ID NOs: 1, 2, 3, 4, 5, 6, 7, 8, 9 and 34.

In some embodiments, the cell-penetrating peptide may be, without limitation, a peptide or cell-penetrating peptide that is composed of an amino acid sequence selected from the group of SEQ ID NOs: 1, 2, 3, 4, 5, 6, 7, 8, 9 and 34 or also a peptide or cell-penetrating peptide consisting of an amino acid sequence represented by SEQ ID NOs: 1, 2, 3, 4, 5, 6, 7, 8, 9 or 34. In one embodiment, the cell-penetrating peptide may also be a peptide or cell-penetrating peptide that is composed of an amino acid sequence having at least 80, 81, 82, 83, 84, 85, 86, 87, 88, 89, 90, 91, 92, 93, 94, 95, 96, 97, 98 or 99% sequence identity to an amino acid sequence selected from the group consisting of SEQ ID NOs: 1, 2, 3, 4, 5, 6, 7, 8, 9 and 34.

The term "specifically" used herein refers to a glycoprotein that has significantly high binding affinity to a specific glycoprotein (for example, 3, 4, 5, 6, 7, 8, 9 or 10 fold increase of binding affinity) as compared with the affinity of a non-specific glycoprotein.

The term "glycoprotein" used herein refers to a protein having a sugar chain linked to a portion of an amino acid constituting the protein.

The term "cell membrane receptor" used herein refers to not only the protein present on the surface of the cell membrane (including a conjugated protein) but also protein that penetrates the cell membrane and is partially present in cytoplasm.

According to another embodiment of the present invention, the present invention may be a cell-penetrating peptide that specifically binds to a glycoprotein or cell membrane receptor of target cells. In some embodiments, the glycoprotein or cell membrane receptor on the cell surface may be a cell marker, and the cell marker may be, for example T-cell line, B-cell line, myeloid, erythroid or megakaryocyte marker or cancer stem cell marker.

In one embodiment, the glycoprotein or the cell membrane receptor on the cell surface may be CD3, CD9, CD11c, CD13, CD14, CD19, CD20, CD29, CD30, CD33, CD34, CD38, CD44, CD45, CD64, CD65, CD105, CD117, CD133, CD166, CD271, CD326, CD338 or CD340 without limitation.

Herein, "inducing apoptosis" may be replaced by killing target cells or causing cell-death.

According to another embodiment of the present invention, a cell-penetrating peptide induces apoptosis of target cells.

In another embodiment of the present invention, the target cells may be cells expressing a T-cell line, B-cell line, myeloid, erythroid or megakaryocyte marker or cancer stem cell marker. Also, the target cells may be, for example, cells expressing CD3, CD9, CD11c, CD13, CD14, CD19, CD20, CD29, CD30, CD33, CD34, CD38, CD44, CD45, CD64, CD65, CD105, CD117, CD133, CD166, CD271, CD326, CD338 or CD340 without limitation. The target cells refer to following cells that suffer from a disorder or a state and following cells that suffer from a cell proliferative disorder may be malignant tumor, that is, cancer cells or tumor cells such as epithelial cancer or carcinoma, nonepithelial cancer or sarcoma or blood cancer (cancer of hematologic cells), and such cancer cells or tumor cells may be epithelial cancers or carcinomas such as hepatocellular carcinoma (liver cell carcinoma or bile duct carcinoma), pancreatic cancer, gastric cancer, colorectal cancer, breast cancer, ovarian cancer, prostate cancer, thyroid cancer or lung cancer (small cell lung cancer or non-small cell lung cancer), laryngeal cancer, pharyngeal cancer or tongue cancer or sarcomas (nonepithelial cancer) such as osteosarcoma, chondrosarcoma, rhabdomyosarcoma, leiomyosarcoma, fibrosarcoma, liposarcoma or hemangiosarcoma or blood cancers such as leukemia, that is, acute myeloid leukemia, acute lymphocytic leukemia, acute promyelocytic leukemia, chronic myeloid leukemia, chronic lymphocytic leukemia, malignant lymphoma or multiple myeloma without limitation.

According to another embodiment of the present invention, a pharmacological activator (activator) or agent may be linked or attached to a terminal moiety of the cell-penetrating peptide directly or via a linker. In the other embodiment, the linker may be a water-soluble macromolecule. In some embodiments, for example, the linker may be, without limitation, polyethylene glycol (PEG) or click chemistry reagent such as an azide(Azide) or dibenzocyclooctine (OBCO) that results in an azide-alkyne cycloaddition reaction. According to some embodiments, the activators or the agents may be bound directly to an amino group terminus (N-terminus) and/or carboxyl group terminus (C-terminus) of the cell-penetrating peptide.

According to some embodiments of the present invention, the activators or the agents may be, without limitation, a protein, peptide, oligopeptide, polypeptide, polynucleotide, polysaccharide, lipid, antibody, antibody fragment, aptamer, nucleic acid (for example, but not limited to, siRNA, shRNA, DNA/RNA hybrid, antisense oligonucleotide or ribozyme), small-molecular drug or any other biological active materials. In some embodiments, the activators or the agents may act intracellularly, or be specific for a component inside the target cells or further be a cytotoxic agent or antimitotic agent. In one embodiment, the activator or the agent may be a cytotoxic radioisotope, chemical toxin or protein toxin. In one embodiment, the activator or the agent may be an anticancer agent or anti-tumor agent may be, for example, paclitaxel, doxorubicin, vindesine, vincristine, vinblastine, methotrexate, mitomycin C, retinoic acid, cisplatin, carboplatin, nedaplatin, oxaliplatin, docetaxel, bleomycin, fluorouracil, epirubicin, actinomycin D, gemcitabine, oteracil potassium or iron oxide nanoparticles without limitation.

According to another aspect of the present invention, the present invention may be a medicine or pharmaceutical composition containing a cell-penetrating peptide comprising a motif selected from the group consisting of RGN, RGH, RYN, LYN, FFN and QYN and motif selected from the group consisting of NGR, SEQ ID NOs: 44 and 45 and having a β-strand structure between the motifs as an active ingredient. Also the present invention may be a medicine or pharmaceutical composition containing a cell-penetrating peptide comprising an RGN motif and NGR motif and having a β-strand structure between the RGN motif and NGR motif as an active ingredient. In the medicine or the pharmaceutical composition of the present invention, the active ingredient may be combined with any other ingredients unless the effect of the active ingredient is not hindered. In some embodiments, the pharmaceutical composition may contain a pharmaceutically acceptable carrier, excipient or diluent and further contain an inert diluent, lubricant, buffering agent or adjuvant such as an antiseptic, stabilizer, wetting agent, emulsifier or buffer. For example, the pharmaceutical composition may be subjected to oral administration, parenteral administration, rectal administration or the like without limitation. The pharmaceutical composition of the present invention may be a solid form (including, but not limited to, a capsule, tablet, pill, granule, powder or suppository) or liquid form (including, but not limited to, a solution, suspension or emulsion). Further, the medicine or the pharmaceutical composition of the present invention may be coated with an appropriate material, for example, delayed disintegrating material or the like or incorporated into an appropriately drug-release system depending on the route of administration, drug-release process and the like.

The medicine or pharmaceutical composition of the present invention described herein may be administered by various routes including both oral and non-oral routes, for example, without limitation, oral, intravenous, intramuscular, subcutaneous, local, intratumoral, rectal, intraarterial, intraportal, intraventricular, transmucosal, percutaneous, intranasal, intraperitoneal, intrapulmonal and intrauterine routes or formulated in a dosage form suitable for each administration route. As such a dosage form and formulation method, any known dosage form and method can be appropriately adopted.

The term "treatment" or "prevention" used herein includes suppression, alleviation, retardation, remission and elimination of a state, illness, symptom or undesirable side effect thereof.

In some embodiments of the present invention, the present invention may be a composition, pharmaceutical composition or medicine for treatment or prevention of cancer or tumor containing an isolated cell-penetrating peptide including a motif selected from the group consisting of RGN, RGH, RYN, LYN, FFN and QYN and motif selected from the group consisting of NGR and SEQ ID NOs: 44 and 45 and having a β-strand structure between the motifs as active ingredient. Also, the present invention may be a cell-penetrating peptide comprising an RGN motif and NGR motif and having a β-strand structure between the RGN motif and NGR motif or composition, pharmaceutical composition or medicine for treatment or prevention of cancer or tumor. Exemplary cancers or tumors may be epithelial cancers or carcinomas such as hepatocellular carcinoma (liver cell carcinoma or bile duct carcinoma), pancreatic cancer, gastric cancer, colorectal cancer, breast cancer, ovarian cancer, prostate cancer, thyroid cancer, lung cancer (small cell lung cancer or non-small cell lung cancer), laryngeal cancer, pharyngeal cancer or tongue cancer, sarcomas (nonepithelial cancer) such as osteosarcoma, chondrosarcoma, rhabdomyosarcoma, leiomyosarcoma, fibrosarcoma, liposarcoma or hemangiosarcoma or blood cancers such as leukemia, malignant lymphoma or multiple myeloma without limitation.

In some embodiments of the present invention, the present invention may also be an isolated cell-penetrating peptide comprising a motif selected from the group consisting of RGN, RGH, RYN, LYN, FFN and QYN and motif selected from the group consisting of NGR and SEQ ID NOs: 44 and 45 and having a β-strand structure between the motifs for treatment or prevention of cancer or tumor.

The term "carrier" used herein refers to a pharmacological activator (activator) or drug transporter, which may have an interaction or auxiliary action with an activator or drug to be transported itself and also have any activity itself.

In some embodiments of the present invention, the present invention is a carrier for pharmacological activator (activator) or drug delivery into cells or nucleus of the target cells, wherein the carrier is an isolated cell-penetrating peptide comprising a motif selected from the group consisting of RGN, RGH, RYN, LYN, FFN and QYN and motif selected from the group consisting of NGR and SEQ ID NOs: 44 and 45 and having a β-strand structure between the motifs. In the present invention, the carrier may specifically bind to a glycoprotein or cell membrane receptor. In an embodiment, the present invention may be a cell-penetrating peptide or carrier peptide or carrier comprising an RGN motif and NGR motif and having a β-strand structure between the RGN motif and the NGR motif for pharmacological activator (activator) or drug delivery into target cells or nucleus of the target cells. Further, the target cells (or malignant tumors) for the carrier of the present invention may be epithelial cancer or carcinoma, sarcoma or blood cancer and are exemplarily without limitation as described above. The cell-penetrating peptide may be amino acid sequences selected from the group consisting of SEQ ID NOs: 1, 2, 3, 4, 5, 6, 7, 8, 9 and 34, and exemplary glycoprotein or cell membrane receptor of the target cells, target cells and activator or agent to be added to the carrier are as described above.

In some embodiments of the present invention, the present invention may be a medicine or a pharmaceutical composition, containing an isolated cell-penetrating peptide comprising a motif selected from the group consisting of RGN, RGH, RYN, LYN, FFN and QYN and motif selected from the group consisting of NGR and SEQ ID NOs: 44 and 45 and having a β-strand structure between the motifs as a carrier peptide or carrier for pharmacological activator (activator) or drug delivery into cells or nucleus of the target cells for treatment or prevention of cancer or tumor. Exemplary amino acid sequences, glycoprotein or cell membrane receptor of the target cells, the target cells (or malignant tumors) and activator or drug are as described above without limitation. A pharmaceutically acceptable carrier, excipient or diluent or inert diluent that may be contained in the aforementioned composition are as described above without limitation.

According to yet another aspect of the present invention, the present invention may be use of a cell-penetrating peptide or carrier peptide or carrier for pharmacological activator (activator) or drug delivery comprising a motif selected from the group consisting of RGN, RGH, RYN, LYN, FFN and QYN and motif selected from the group consisting of NGR and SEQ ID NOs: 44 and 45 and having a β-strand structure between the motifs in production of a medicine or pharmaceutical composition for treatment or prevention of cancer or tumor. Also, the present invention may be use of a cell-penetrating peptide comprising an RGN motif and NGR motif and having a β-strand structure between the RGN motif and NGR motif in production of a medicine or a pharmaceutical composition for treatment or prevention of cancer or tumor. Exemplary cancer or tumor, application of a medicine or pharmaceutical composition, an amino acid sequences that may be contained in a cell-penetrating peptide or carrier peptide or carrier for pharmacological activator (activator) or drug delivery, glycoprotein or cell membrane receptor of target cells, the target cells (or malignant tumors) and activator or agent, pharmaceutically acceptable carrier, excipient or diluent that may be contained, further inert diluent, lubricant, buffering agent and the like are as described above without limitation.

According to yet another aspect of the present invention, the present invention may be a method for treating or preventing cancer or tumor in a subject comprising administering to a subject with cancer or tumor a therapeutically effective amount of a cell-penetrating peptide comprising a motif selected from the group consisting of RGN, RGH, RYN, LYN, FFN and QYN and motif selected from the group consisting of NGR and SEQ ID NOs: 44 and 45 and having a β-strand structure between the motifs, or carrier peptide or carrier for pharmacological activator (activator) or drug delivery. Also, the present invention may be a method for treating or preventing cancer or tumor in a subject comprising administering to a subject with cancer or tumor a therapeutically effective amount of a cell-penetrating peptide comprising an RGN motif and NGR motif and having a β-strand structure between the RGN motif and the NGR motif. According to one embodiment, the subject may be human or a nonhuman mammal subject such as monkey, cattle, pig, sheep, horse, dog, cat, rabbit, mouse, rat, hamster, bird, turtle, soft-shelled turtle or zebrafish. Exemplary cancers or tumors are as described above without limitation.

The effective amount in various methods of the present inventions described herein may be, for example, about cancer, an amount to push to kill the cancer cells or kill the cancer cells, about proliferation of the cancer cells, amount to suppress the proliferation of the cells or delay the cell proliferation. About treatment of a disease, the effective amount may be an amount to decrease the symptom of the disease or delay or stop the progression of the disease or also amount to suppress or heal the disease. Such an amount can be appropriately determined by an in vitro test using cultured cells or the like or test with model animals such as mouse, rat, dog, pig or monkey, and these kinds of tests are well known by those skilled in the art. Also, the dose of a drug used in a treatment method of the present invention is known by those skilled in the art or can be appropriately determined by the aforementioned tests or the like. A specific dose of an active ingredient administered in the treatment method of the present invention described herein can be determined in consideration of various conditions for a subject required for treatment such as, for example, state or stage of cancer, the seriousness of symptom, the general health status, age, body weight, gender of the subject, diet, the timing and frequency of administration, concomitant medicine, reactivity for therapy, a dosage form and compliance with therapy.

In some embodiments, the present invention may be administered to a subject at least every 4, 3, 2 or 1 days as a number of times a day (i.e., 2, 3, 4, 5 or more a day) in a dose of about 2.5, 5, 7.5, 10.0, 12.5 or 15 mg/kg or in the range of about 2.5 to 15 mg/kg by oral, intraportal, intravenous, intramuscular, subcutaneous, transnasal, transpulmonary, percutaneous, local, intratumoral, transmucosal, percutaneous, intranasal, intraperitoneal, intrapulmonal, intrauterine, sublingual or rectal administration. The total dose per day of the present invention may be, for example, about 1 μg/kg body weight to about 1,000 mg/kg body weight, about 10 μg/kg body weight to about 100 mg/kg body weight, about 100 μg/kg body weight to about 10 mg/kg body weight or the like without limitation. Exemplary cancers or tumors, cell-penetrating peptides, amino acid sequences that may have carrier peptide or carrier for pharmacological activator (activator) or drug delivery, target cells (or malignant tumors) and the like are as described above.

EXAMPLES

The present invention will be described in more detail by the following Examples, but the examples are merely exemplary and not intended to limit the present invention.

The two-tailed t test was performed for significant difference tests in FIGS. 1, 2A to E, 6 and 7. Detected at a level of 5% or 1%, the significant difference is represented by * or **, respectively.

Preparation of Peptides

The peptides used in the present invention can be chemically synthesized or also produced by genetic engineering. The peptides used in the present invention or a peptide to which the agent is added can be prepared in accordance with a general method known by skilled artisan. The peptides were produced on consignment by MEDICAL & BIOLOGICAL LABORATORIES CO., LTD. (Japan) or GenScript (Japan). Briefly, a H-Cys(Trt)-2-chlorotrityl chloride (CTC) resin (Merck) was swollen in DMF. Subsequently, the CTC resin was stirred for 1 hour under conditions of Fmoc-amino acid (4 equivalents), DIC (4 equivalents) and HOBt (4 equivalents) to introduce Lys (Boc), Trp (Boc), Glu (OtBu), Gly, Arg (Pbf), Gly, Asn (Trt), Gly, Thr (tBu), Cys (Trt), Val, Cys (Trt), Gln (Trt), Leu, Leu, Asn (Trt), Gly, Arg (Pbf), Asn (Trt), Asp (OtBu) and Lys (Boc) successively into the CTC resin by a coupling reaction. The resin was treated with 20% piperidine/DMF, washed with methanol and dried to obtain a peptide-resin. 100 mg of the obtained peptide-resin was treated at 30° C. for 4 hours with 3 mL of cleavage cocktail (TFA/1,2-ethanedithiol/thioanisole/phenol/$H_2O$/triisopropylsilane=68.5/10/10/5/3.5/1 V/V). The cold diethyl ether was added to that peptide-resin and dried at room temperature to obtain a peptide. Subsequently, the obtained peptide was subjected to preparative purification by reverse-phase HPLC under conditions of a column C18, a flow rate of 1 mL/min, linear gradient elution with an A liquid (100% water, 0.1% TFA) and a B liquid (100% acetonitrile, 0.1% TFA) and detection at 210 nm to obtain a peptide as Example 1 (SEQ ID NO: 1) (MEDICAL & BIOLOGICAL LABORATORIES CO., LTD.).

Separately from Example 1, FITC was bound to the aforementioned peptide-resin via an Ahx linker and the peptide was purified in the same manner as described above to obtain a peptide as Example 2 (SEQ ID NO: 32 with a FITC sequence added to the N-terminus thereof) (GenScript).

Further separately, the aforementioned peptide-resin was mixed with Azide-PEG4-NHS (CLICK CHEMISTRY TOOLS) in an equivalent amount in a DMF solvent. Ten times equivalent of DIEA was further added to this solution and the mixture was stirred at room temperature for 1 hour to adjust the obtained peptide (M.W.2725.09, 95%, 100.5 mg, TFA free) (PH Japan Co., Ltd.) with sterilized Milli-Q water to 50 mg/mL (17.5 mM). Once 1 mL of 0.5 M phosphoric acid buffer (pH: 5.5) was added to 4 mL (11 mg/mL) of Doxorubicin (Dox) (Carbosynth) dissolved in sterilized Milli-Q water, 20 mL of sterilized Milli-Q water was added to it to obtain a Dox solution. On the other hand, 0.5 mL (25 mg/mL) of DBCO-PEG5-NHS Ester (Click Chemistry Tools, AZ, USA) dissolved in DMSO and 7.5 mL of the Dox solution were mixed at room temperature for 3 hours to obtain a reaction solution. The reaction solution was adsorbed to a 1-mL Resource 15 RPC column (GE Healthcare) equilibrated with an A buffer (0.1% (V/V) acetic acid (FUJIFILM Wako Pure Chemical Corporation)). Then, a Dox-PEG5-DBCO fraction was fractionated by a linear gradient of 30 to 44% in the A buffer and a B buffer (acetonitrile (ANC) containing 0.1% (V/V) acetic acid (FUJIFILM Wako Pure Chemical Corporation): water=90: 10) at a flow rate of 1 mL/min. At the same time, the absorbance at 210 nm to 500 nm was monitored. The fractionated fraction was concentrated with a centrifugal concentrator and dissolved in DMSO to be 67 mg/mL (52.6 mM). The peptide obtained above and the concentration-adjusted Dox-PEG5-DBCO solution were mixed at a molar ratio of 1:1 in DMSO at room temperature for 3 hours. The obtained reaction solution was adsorbed to the column and then fractionated by a linear gradient of 20 to 45% in the A buffer and the B buffer in the same manner as described above. The fractionated fraction was concentrated in the same manner as described above and then dissolved in sterilized Milli-Q water to obtain a peptide as Example 3 (SEQ ID NO: 33 with a doxorubicin (Dox)-$PEG_5$-dibenzylcyclooctyne (DBCO)-azide-$PEG_4$ sequence added to the N-terminus thereof).

Lys (Boc), Trp (Boc), Glu (OtBu), Gly, Arg (Pbf), Gly, Asn (Trt), Gly, Thr (tBu), Cys (Trt), Val and Cys (Trt) were successively introduced into the aforementioned CTC resin, fractioned and purified by the same procedure as that of Example 1 to obtain a peptide as Comparative Example 1 (SEQ ID NO: 29) (MEDICAL & BIOLOGICAL LABORATORIES CO., LTD.).

Arg (Pbf), Gly, Asn (Trt) and Cys (Trt) were successively introduced into the aforementioned CTC resin by the same procedure as that of Example 1. Next, the obtained peptide-resin was subjected to an oxidation reaction in the solvent having the ratio of 1:1 of water and DMSO for 24 hours under the peptide concentration of 1 mg/mL to obtain a fractioned and purified peptide as Comparative Example 3 (SEQ ID NO: 31) (MEDICAL & BIOLOGICAL LABORATORIES CO., LTD.) in the same manner as described above.

Also, Lys (Boc), Trp (Boc), Glu (OtBu), Gly, Arg (Pbf), Gly, Asn (Trt), Gly, Thr (tBu), Cys (Trt), Leu, Cys (Trt), Gln (Trt), Leu, Leu, Asn (Trt), Gly, Arg (Pbf), Asn (Trt), Asp (OtBu) and Lys (Boc) were successively introduced into the aforementioned CTC resin by the same procedure as that of Example 1 to obtain a fractioned and purified peptide (SEQ ID NO: 34). Also, FITC was bound to a peptide-resin obtained as a result via an Ahx linker to obtain a fractioned and purified peptide as Example 4 (SEQ ID NO: 35 with a FITC sequence added to the N-terminus thereof) (GenScript).

Lys (Boc), Trp (Boc), Glu (OtBu), Gly, Arg (Pbf), Gly, Asn (Trt), Gly, Thr (tBu), Cys (Trt), Ile (Boc), Cys (Trt), Gln (Trt), Leu, Leu, Asn (Trt), Gly, Arg (Pbf), Asn (Trt), Asp (OtBu) and Lys (Boc) were successively introduced into the aforementioned CTC resin by the same procedure as that of Example 1 to obtain a fractioned and purified peptide (SEQ ID NO: 2). Also, FITC was bound to a peptide-resin obtained as a result via an Ahx linker to obtain a fractioned and purified peptide as Example 5 (SEQ ID NO: 36 with a FITC sequence added to the N-terminus thereof) (GenScript).

Trp (Boc), Cys (Trt), Glu (OtBu), Gly, Arg (Pbf), Gln (Trt), Gly, Asn (Trt), Leu, Ser (tBu), Met, Lys (Boc), Cys (Trt), Gln (Trt), Lys (Boc), Leu, Asn (Trt), Trp (Boc), Leu, Gly, His (Trt) and Lys (Boc) were successively introduced into the aforementioned CTC resin by the same procedure as that of Example 1 to obtain a fractioned and purified peptide (SEQ ID NO: 6). Also, FITC was bound to a peptide-resin obtained as a result via an Ahx linker to obtain a fractioned and purified peptide as Example 6 (SEQ ID NO: 37 with a FITC sequence added to the N-terminus thereof) (GenScript).

After N-terminal Fmoc was deprotected with 5% piperidine-containing DMF (0.1% HOBt) using a Fmoc-Trp (Boc)-Wang resin (Merck), Glu (OtBu), Gly, Arg (Pbf), Gly, Asn (Trt) and Gly were successively introduced into the resin by the same procedure as that of Example 1 to obtain a fractioned and purified peptide as Comparative Example 2 (SEQ ID NO: 30) (MEDICAL & BIOLOGICAL LABORATORIES CO., LTD.).

Amino acid sequence primary structure information of Examples 1 to 6 and Comparative Examples 1 to 3 was confirmed by matrix-assisted laser desorption/ionization spectroscopy, and the degree of purification was analyzed by reverse phase-HPLC (C18), and confirmed to be 98% or more.

Cell Culture

Human fibrosarcoma-derived HT-1080 cells (HT-1080 cells, JCRB cell bank) were used as cancer cells in the test for monitoring changes in mitochondrial membrane potential. HT-1080 cells, human osteosarcoma cell line Hos cells (Hos cells, JCRB cell bank), human histiocytic lymphoma/macrophage U937 cells (U937 cells, JCRB cell bank), human myeloid leukemia HL-60 cells (HL-60 cells, JCRB cell bank), acute monocytic leukemia THP-1 cells (THP-1 cells, JCRB cell bank), human alveolar basal epithelial adenocarcinoma cell A549 cells (A549 cells, Cell Resource Center for Biomedical Research, Institute of Development, Aging and Cancer, Tohoku University), human pancreatic carcinoma cells (MIA Paca 2 cells, Cell Resource Center for Biomedical Research, Institute of Development, Aging and Cancer, Tohoku University) and well differentiated human liver carcinoma-derived cell line HuH7 cells (HuH7 cells, Cell Resource Center for Biomedical Research, Institute of Development, Aging and Cancer, Tohoku University) were used as cancer cells in an in vitro cell-death induction test of cancer cells and a nuclear transport test of Example 2. Normal human gingival fibroblast cells Gin-1 (Gin-1 cells, DS Pharma Biomedical) were used as a control. The above-described cells were each inoculated into a 96-well culture plate (Falcon) at 5,000 cells/100 L and subjected to the following tests.

Preparation of Mouse with Cancer

HT-1080 cells ($1 \times 10^7$ cells/200 μL) were subcutaneously implanted into the back of 5 week-old BALB/c nude mouse (CHARLES RIVER LABORATORIES JAPAN, INC.). A tumor after the implantation was confirmed to reach 30 to 60 mm$^3$, and then they were subjected to the following tests.

Test Example 1

Test of Monitoring Changes in Mitochondrial Membrane Potential

The synthetic peptide of Example 1 or Comparative Examples 1 to 3 was individually added to the HT-1080 cells, and the cells were cultured in a serum-supplemented medium (α-MEM+10% FBS). As a control, the HT-1080 cells were cultured in a serum-supplemented medium (α-MEM+10% FBS) without addition. After the cells were cultured for 7 days, the cells were washed once with phosphate buffered saline (PBS) and dyed with 2 μM JC-1 at 37° C. and 5% $CO_2$ in the cell incubator for 30 minutes. Further, the cells were washed once with PBS followed by the addition of 100 μL of PBS, scanned with a confocal laser scanning microscope LSM800 (Zeiss) and then analyzed with ImageJ.

In FIG. 1, the vertical axis represents the average value of apoptosis rate (number of green cell dyed with JC1/number of total cells$\times 100(\%)$)±standard deviation (SD) and the horizontal axis represents Example 1 and Comparative Examples 1 to 3. The left, center and right bars in Example 1 represent each concentration of the added peptide of 25, 50 and 100 μg/mL, respectively. The left and right bars in Comparative Examples 1 to 3 represent each concentration of the added peptide of 50 and 100 μg/mL, respectively. An increase in apoptosis rate of the HT-1080 cells was confirmed only in a case where the cells were stimulated with Example 1. On the other hand, the increases in apoptosis rate of the HT-1080 cells were not observed in Comparative Examples 1 to 3. Also, the increase in apoptosis rate was not observed in administration of 50 μg/mL of Example 1 to the Gin-1 cells. The cell-penetrating peptide of the present invention was proved to have an apoptosis-inducing action on the cancer cells although the cell-penetrating peptide did not affect the normal cells.

Test Example 2A

Test of Inducing Cell-Death In Vitro in Cancer Cells

The peptide of SEQ ID NO: 1 labeled with FITC (Example 2) was used for the test of inducing cell-death in vitro in cancer cells. It was prepared the test example to which 100 μL of Example 2 and further 10% FBS were added and cultured for 9 days under conditions of 200 μL of serum-supplemented medium (Alpha modification of Eagle's MEM (α-MEM) (Thermo Fisher Scientific)+10% FBS). Furthermore, it was also produced the test example that was cultured for 21 days with the whole amount of Example 2-supplemented medium replaced every 7 days. As a control, the cells were cultured in a serum-supplemented medium (α-MEM+10% FBS) without addition and were used. A supernatant was removed after the completion of the culture. The cells were washed once with PBS and stained in PBS to which a fluorescent dye for living cell staining Calcein-AM (DOJINDO LABORATORIES) (final concentration: 0.1 μg/mL) and a fluorescent dye for dead cell staining Propidium Iodide (PI) (DOJINDO LABORATORIES) (final concentration: 0.3 μg/mL) were added, at 37° C. in a 5% $CO_2$ cell incubator for 30 minutes. The living cells and dead cells were separately stained with Calcein-AM and PI, respectively and imaged with the confocal laser scanning microscope LSM800. Next, the dead cell rate relative to the number of total cells was analyzed using ImageJ.

Figure 2A:
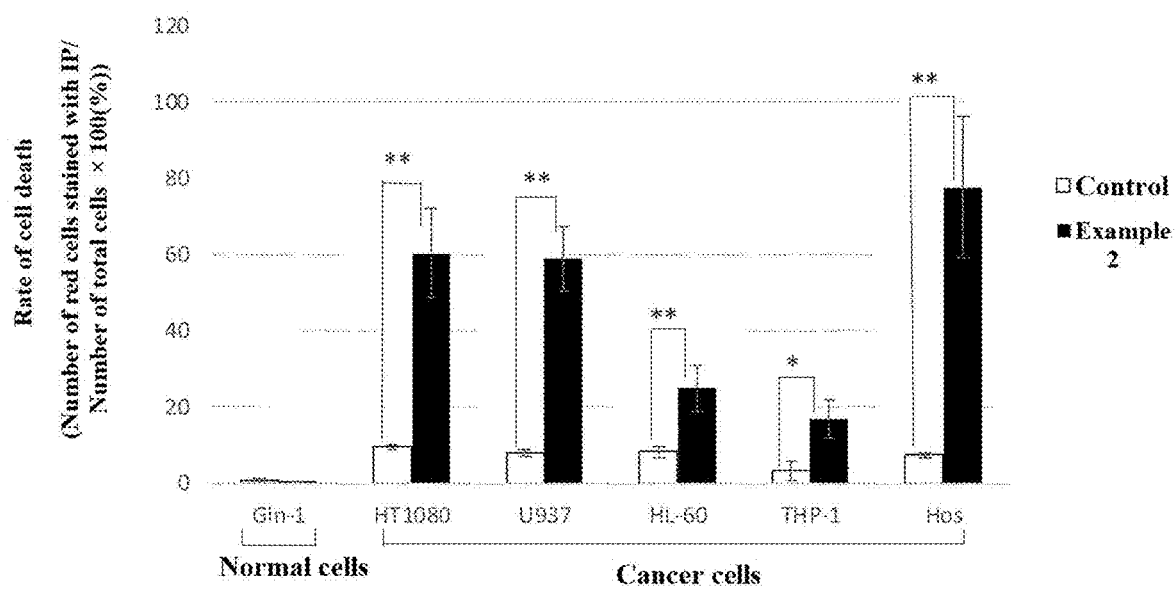
FIG. 2A is a graph illustrating a cell-death inducing action of Example 2 on normal cells and various types of cancer cells.

The results are represented by the average value of the dead cell rate (the number red cells stained with IP/the number of total cells$\times 100(\%)$)±standard deviation (SD). In FIG. 2A, the vertical axis represents the rate of cell death when each cell was cultured with Example 2 (50 μg/mL) for 9 days and the horizontal axis represents various types of cells. The increase in the dead cell rate of the Gin-1 cells was not observed. On the other hand, the increase in the dead cell rate of the HT-1080 cells, U937 cells, HL-60 cells and Hos cells was recognized as the significant difference at the level of 1%. The increase in dead cell rate of the THP-1 cells was recognized as the significant difference at the level of 5%.

The increase in the dead cell rate by about 75% or more was observed in each administration of 6.25 and 12.5 μg/mL of Example 2 to the HT-1080 cells on day 21 in the culture. Further, the increase in the dead cell rate by 95% or more was recognized as a result of the administrations of 25, 50 and 100 μg/mL (not shown). Since the cell-penetrating peptide of the present invention didn't have the action of inducing cell-death on normal cells but the action of inducing cell-death on cancer cells, the very high selective toxicity was demonstrated.

Test Example 2B

Test of Inducing Cell-Death In Vitro in Cancer Cells

The peptides of SEQ ID NOs: 34, 2 and 6 labeled with FITC were used as Examples 4, 5 and 6, respectively for the test of inducing cell-death in vitro in the cancer cells.

The concentrations of Examples 2 and 4 to 6 were adjusted to 12.5, 25, 50 and 100 μg/mL, respectively and then administrated to the HT-1080 cells for 9 days tested by the same method as in Test Example 2A. The cell staining and subsequent analyses of the dead cell rate relative to the number of total cells were performed in the same manner as Test Example 2A.

In FIG. 2B, a vertical axis represents the dead cell rate of the HT-1080 cells cultured with each of Examples 2 and 4 to 6 (12.5, 25, 50 and 100 μg/mL, respectively) at the 9th day, and a horizontal axis represents each Example, administration concentration and control. The increases in the dead cell rate of the HT-1080 cells were recognized as significant differences at the level of 1%. At least 60% or more of the dead cell rate was shown in the administrations of 50 or 100 μg/mL of Example 2. At least 60% and 50% or more of the dead cell rate were shown in the administrations 50 or 100 μg/mL of Examples 4 or 5, respectively. About 50% to 40% of the dead cell rate was shown in the administration of 25 or 12.5 μg/mL of Examples 2, 4 and 5. Especially the Example 6 showed that the dead cell rate even in the administration of 12.5 μg/mL was substantially same as that of 100 μg/mL, and the dead cell rate of about 35% was maintained. It was demonstrated that Examples 2 and 4 to 6 were effective even at the administration concentration of 12.5 μg/mL by this experiment.

Test Examples 2C to E

Tests of Inducing Cell-Death In Vitro of Cancer Cells

The amount of administration of Example 2 was adjusted to 50 μg/mL and was used for 9-, 16- or 23-day administration test in the A549, MIA Paca2 or HuH7 cells by the same method as in Test Example 2A above. The cell staining and subsequent analyses of the dead cell rate relative to the number of total cells were performed in the same manner as Test Example 2A above.

In FIGS. 2C to E, a vertical axis represents the dead cell rate at the time when the various types of the cells were cultured with Example 2 (50 μg/mL) for 9, 16 or 23 days, and a horizontal axis represents Example 2 and control. The significant difference was recognized at the level of 1% in an increase in the dead cell rate of each cells. The dead cell rates on the day 9, 16 and 21 were confirmed to be nearly 50, 60 and 80% or more, respectively in the administration test to the A549 cells shown in FIG. 2C. Although the dead cell rate on the day 9 was about 10% in the administration test to the MIA Paca2 cells shown in FIG. 2D, it was demonstrated that those of day 16 and 23 were, almost 50 and about 80%, respectively. This showed that the present invention is effective for the pancreatic cancer for which is little effective treatments. Further, this showed that the effect of Example 2 for these cancer cells was given day by day. Besides, as the effects of administration on the day 9 were substantially same as that of days 16 and 23 in the administration test to the HuH7 cells shown in FIG. 2E, a cancer cell-killing effect was demonstrated from the initial phase of administration. Thus, effectiveness of the present invention against the epithelial cancer was confirmed.

Test Example 3

Analytical Tests of Binding Protein by Immunoprecipitation

Example 2 (80 μg/400 μL) reacted to HT-1080 cells (40 million cells) at 4° C. for 2 hours. The cells were then washed with PBS, and centrifuged. The centrifuged cells were dissolved in 1,000 μL of IP Lysis/Wash buffer (Thermo Fisher Scientific) with Halt Protease & Phosphatase inhibitor Single-Use Cocktail, ETDA-Free (Thermo Fisher Scientific) (10 μL) at 4° C. for 5 minutes. It was centrifuged at 4° C. for 10 minutes and the supernatant was collected. The supernatant was adjusted to be 1 mg in amount of protein and 80 μL of A/G agarose was added to it. The mixture was stirred at 4° C. for 1 hour and then centrifuged for 1 minute. Thus, a pre-treatment solution was obtained. 10 μg of IgG Fraction Monoclonal Mouse Anti-Fluorescein (FITC) (Jackson ImmunoResearch) or 10 μg of Mouse IgG Isotype Control (Thermo Fisher Scientific) was each added to the pre-treatment solution (1 mg/600 μL), and the mixtures were shaken at 4° C. overnight. Subsequently, 20 μL of A/G agarose was added and the mixtures were shaken at 4° C. for 2 hours. The mixtures were washed three times with the wash buffer described above and 20 μL of 2×Non-reducing Lane Marker Sample Buffer (Thermo Fisher Scientific) was added to the A/G agaroses. The mixtures were heated at 100° C. for 5 minutes centrifuged for 1 minute, and collected as the samples. The samples were loaded on an SDS-PAGE gel (8%). In Western blotting, a PE-labeled human CD13 antibody (Clone: WM-15 Biolegend), IgG Fraction Monoclonal Mouse Anti-Fluorescein (FITC) or an HRP-labeled anti-tubulin antibody (MBL life science) was used as a primary antibody, and an HRP-labeled anti-mouse IgG antibody (Abcam) was used as a secondary antibody.

Figure 3:
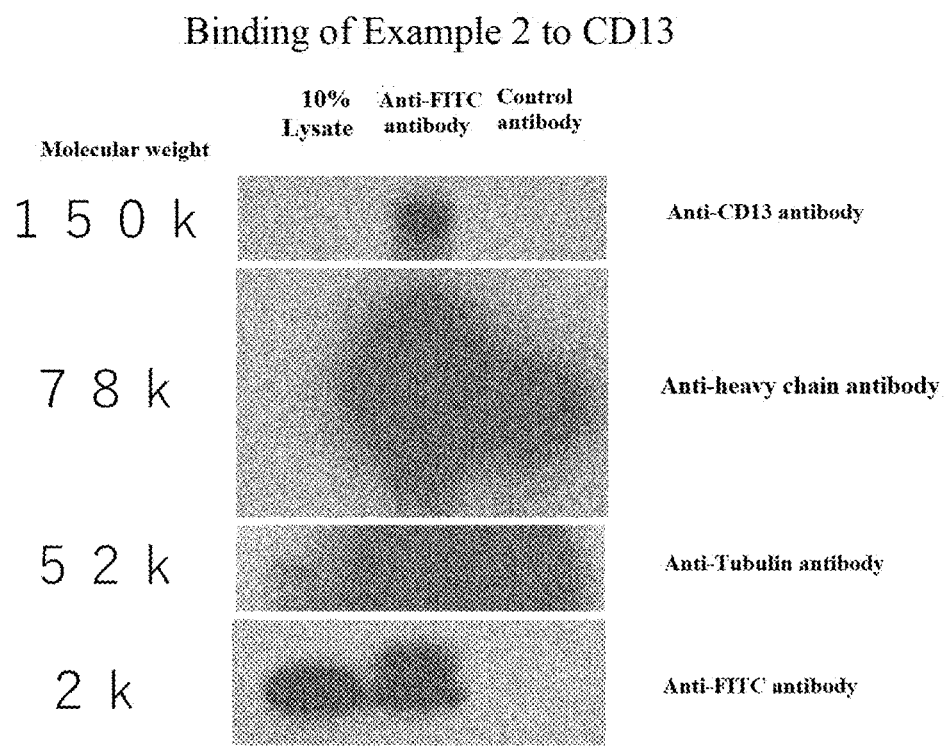
FIG. 3 is an image of immunoprecipitation illustrating binding of Example 2 to CD13.

The 10% solution used in immunoprecipitation was loaded to the left lane of FIG. 3. The sample immunoprecipitated with IgG Fraction Monoclonal Mouse Anti-Fluorescein (FITC) was loaded to the center lane. The sample immunoprecipitated with Mouse IgG Isotype Control was loaded to the right lane. CD13 was not detected on the right lane, but CD 13 was detected on the center lane. That is, Example 2 was proved to bind to CD13 on a cell membrane specifically.

Test Example 4

Binding Test to Cell Membrane with Example 2

A PE-labeled human CD13 antibody (Clone: WM-15 Biolegend) (1p g/100 μL) and Example 2 (1 μg/100 μL) were added to each of the cells (500,000 cells/100 L), and the cells were stained at 4° C. for 1 hour. After the cells were washed with PBS, CD13 expression of each cell and binding site of Example 2 were observed as the standard of the fluorescence intensity of the HT-1080 cells using the confocal laser scanning microscope LSM800. The expression of CD13 (red) was strongest and the luminescence of Example 2 (green) was also strong in the HT-1080 and Gin-1 cells. As the strong yellow was observed in overlay images, it is observed that Example 2 and CD13 colocalized. Further, the same phenomenon about CD13 expression was also recognized in the U937, HL-60, THP-1 and Hos cells (not shown).

Test Example 5A

Tests on Nuclear Transport of Example 2 in Cancer Cells

The cells were cultured in 200 μL of serum-supplemented medium (α-MEM+10% FBS) to be 50 μg/mL at the final concentration of Example 2 for 3 or 9 days. The cell-death was not detected in the culture on day 3. On the contrary, since the cell-death was detected in the culture on day 9, the day 9 culture as described above was used for the tests. The above each cell was separated and transferred to a Cellview glass bottom dish (35×10 mm) (Greiner). The cells on day 3 were fixed with 10% formalin-ethanol and then dyed with DAPI. The cells on day 9 were dyed with DAPI without fixation. Further, the cells were observed with the confocal laser scanning microscope LSM800 over time.

Figure 4:
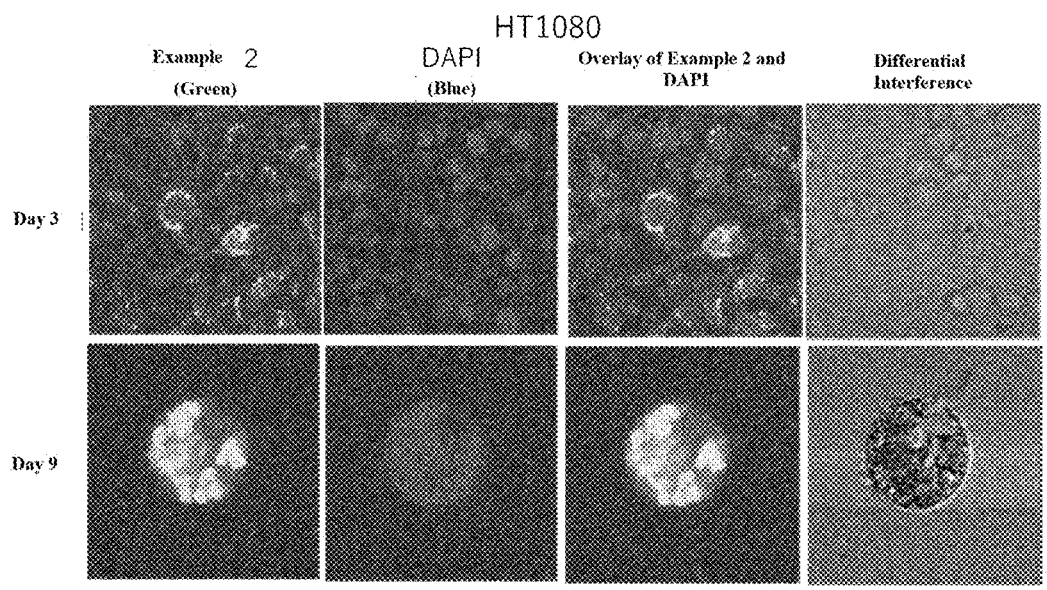
FIG. 4 is a photographic image with a confocal microscope when Example 2 is administered to cancer cells.

FIG. 4 is the photographs of Example 2 (green), DAPI (blue), overlay images of Example 2 (green) and DAPI (blue) and differential interference image on the HT-1080 cells on day 3 or 9. Example 2 (green) was present at a cytoplasm around DAPI (blue) of nuclear staining dye in the HT-1080 cells on day 3. However, since the images overlaid with Example 2 and DAPI dye in the HT-1080 cells on day 9 took on light blue, it was confirmed that Example 2 transferred to a nucleus and bound to a chromosome DNA.

Figure 5:
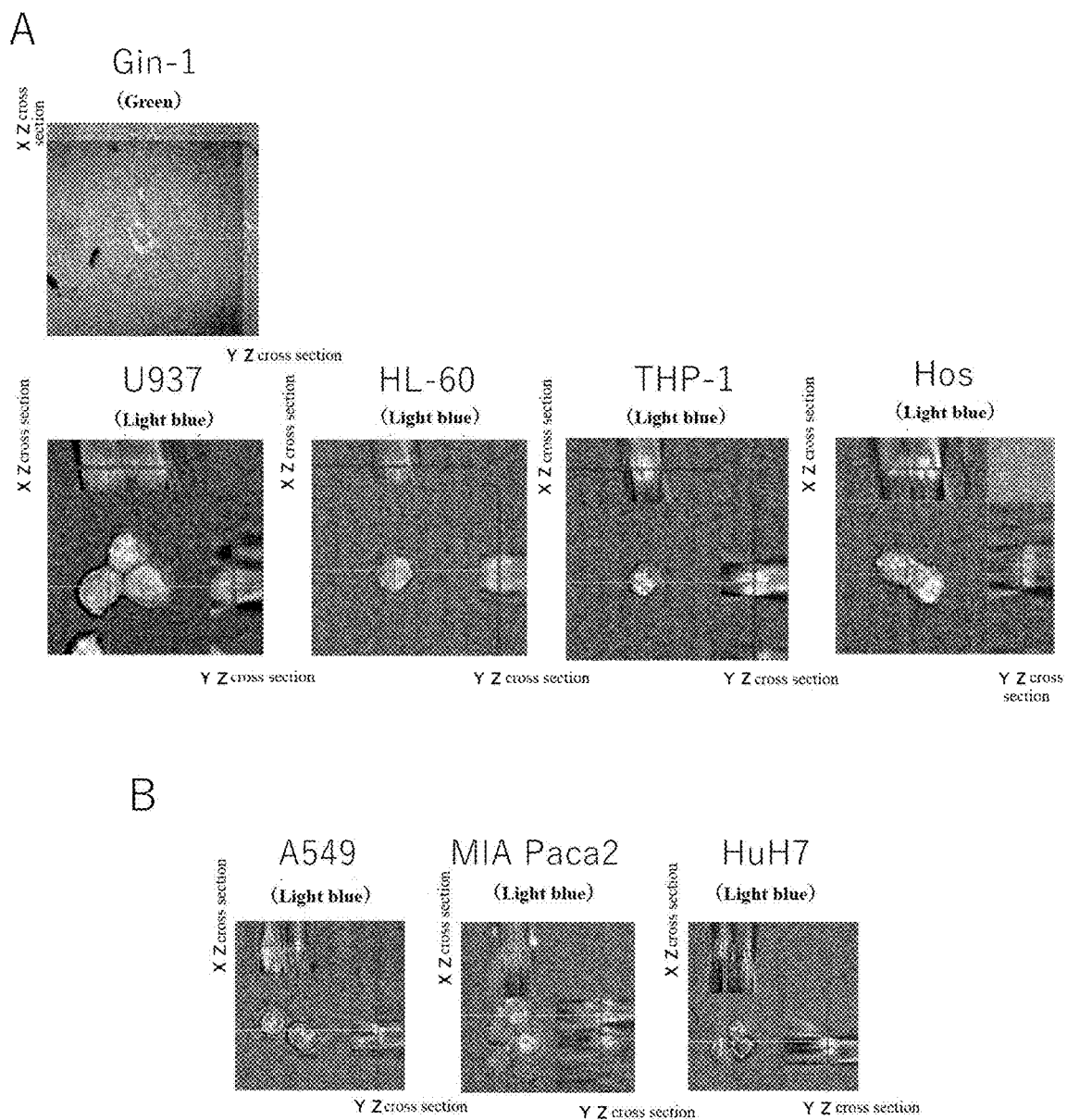
FIGS. 5A and B are photographic images with a confocal microscope when Example 2 is administered to normal cells and various types of cancer cells.

Further, 50 μg/mL of Example 2 was added to the Gin-1 or above cancer cells. The cells were cultured for 9 days and scanned with Z scan technique using the confocal laser scanning microscope LSM800 after dyed with DAPI. FIG. 5A is each photograph of XY, XZ and YZ cross sections that was merged with Example 2 (green) and DAPI (blue) in the Gin-1 or above-described cancer cells. Since the nucleus of the Gin-1 cells was not dyed with DAPI, but Example 2 was confirmed to remain still in the cytoplasm with the XZ and YZ cross sections also. The color of the images merged with the Example 2 and DAPI dye took on light blue in the U937, H1-60, THP-1 and Hos cells. Example 2 was confirmed to transfer to a nucleus and bind to a chromosome DNA with the XZ or YZ cross sections in each of the cells.

Similarly, 50μ/mL of Example 2 was added to the A549, MIA Paca2 and HuH7 cells. The cells were cultured for 23 days and then scanned by the Z scan technique using the confocal laser scanning microscope LSM800 after dyed with DAPI. FIG. 5B is each photograph of XY, XZ and YZ cross sections that were merged with Example 2 (green) and DAPI (blue) in the variety of cancer cells. As a result, the color of the images merged with Example 2 and DAPI dye took on light blue. Example 2 was confirmed to transfer to a nucleus and bind to a chromosome DNA with the XZ and YZ cross sections of each cells.

Test Example 5B

Analytical Tests of Cytoplasm and Nuclear Protein bound by Example 2

The HT-1080 cells (20 million cells) were cultured in 4 mL of serum-supplemented medium (α-MEM+10% FBS) to be 50 μg/mL at the final concentration of Example 2 for 5 days at 37° C. and 5% $CO_2$ in the cell incubator. The cells were washed with PBS and collected. The protein was individually harvested from the cytoplasm and the nucleus using NE-PER Nuclear and Cytoplasmic Extraction Reagents (PIERCE). 80 μL of A/G agarose was added to 1 mg of each protein from the cytoplasm and the nucleus and stirred at 4° C. for 1 hour, the samples were pretreated. 10 μg of IgG Fraction Monoclonal Mouse Anti-Fluorescein (FITC) (Jackson ImmunoResearch) was added to the pretreated solution (1 mg/600 μL) and shaken at 4° C. overnight. Subsequently, 20 μL of A/G agarose was added to the mixtures and shaken at 4° C. for 2 hours. After the mixtures were washed three times with a wash buffer, 50 μL of elution buffer (Thermo Fisher Scientific) was added to the A/G agarose. The samples were collected and 5 μL of Neutralization Buffer (Thermo Fisher Scientific) was added to those to adjust the pH to neutral. Those were used as the samples for the identification of the proteins bound to Example 2. The proteins were comprehensively identified by the shotgun analysis using Waters Xevo G2-XS Qtof (Waters Xevo G2-XS).

Proteins were identified from the cytoplasm or nucleus and listed with the accession number, protein name, identified number of detected peptides, identified number of unique peptides, confidence score and amount of cytoplasmic protein or nuclear protein(fmol), except for the antibodies used in immunoprecipitation and Example 2 from the detected proteins.

As a result of analyses, linker histones H1-3, core histones (H2A, H2B, H3-2 and H4), 22 types of 40S ribosomal proteins and 28 types of 60S ribosomal proteins were individually identified. The 40S and 60S ribosomal proteins were more detected in the nucleus than in the cytoplasm. This shows that Example 2 transferred to the nucleus and then bound to the 40S and 60S ribosomal proteins present also in the nucleus. Example 2 was biochemically proved to transfer to the inside of the nucleus with the aforementioned analyses.

Test Example 6

Tests on Growth-Inhibition and Apoptosis of Cancer Cells with Example 2 in Tumor-Bearing Mice Example 2 was dissolved in the sterile water and adjusted to be 200 μg/200 μL by the addition of 2-time concentrated α-MEM (not containing glutamine or an antibiotic). It was intraperitoneally administered to tumor-bearing mice at 10 mg/kg every 3 days. In the control administration group, 200 μL of 1-time concentrated α-MEM was intraperitoneally administered to tumor-bearing mice every 3 days. The mice were weighed on DRETEC weighing scale (DRETEC CO., Ltd., Japan) and the tumor size (estimation volume (shortest diameter×longer diameter×height×pi/6 $mm^3$)) was measured with a vernier caliper (maximum: 150 mm, minimum: 0.05 mm) (MITUTOYO, Japan) every 3 days.

Figure 6:
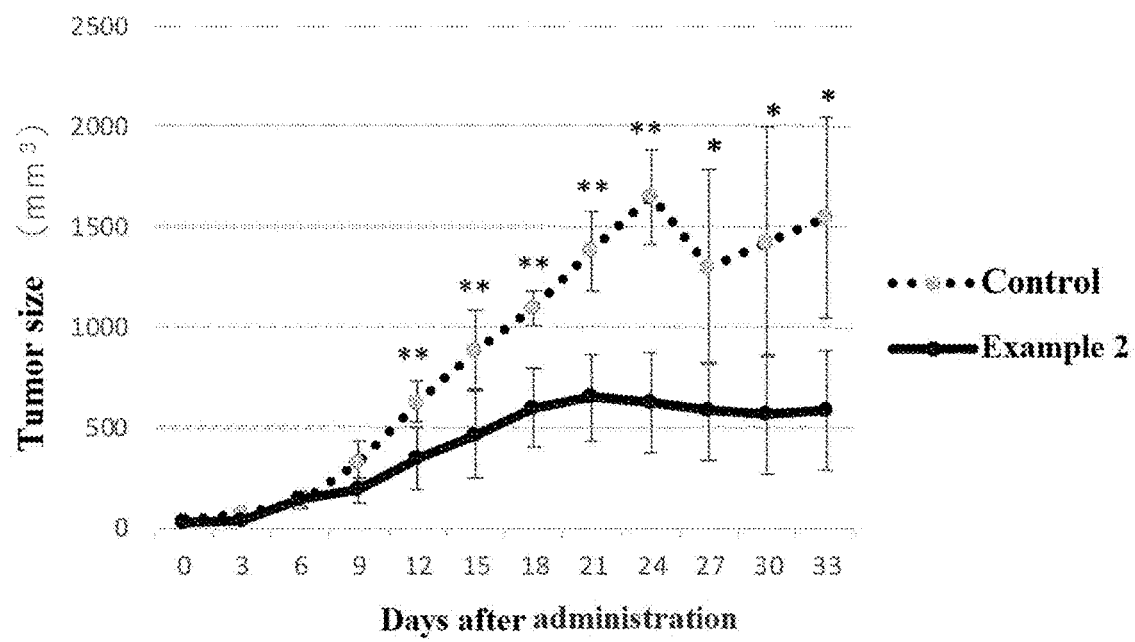
FIG. 6 is a graph illustrating the tumor size after administration of a control or Example 2 and the number of administration days.

FIG. 6 is a graph illustrating the transitions of tumor size in the Example 2 and control administration group (N=6). The vertical axis represents the average value of tumor size±standard deviation (SD), and the horizontal axis represents the days after administration. The growth inhibition of the tumor was recognized as the significant difference at a level of 1% in the Example 2 administration group between days 12 and 24 compared with the control administration group. In the control administration group, the tumor size on day 24 was more than 1,500 $mm^3$. On the other hand, the effect of suppressing tumor growth was confirmed as the tumor size was about 600 $mm^3$ in the Example 2 administration. Further, a tendency to shrink the tumor was confirmed to the 33th day.

Test Example 7

Delivery Tests on Anticancer Agent of Example 3 in Tumor-Bearing Mice

Example 3 and Comparative Example 4 (Dox) were treated to be at 5 or 1.2 mg/kg, respectively in the same manner as that of Example 2, and administered to the tumor-bearing mice. The tumor size was measured by the same procedure as above.

Figure 7:
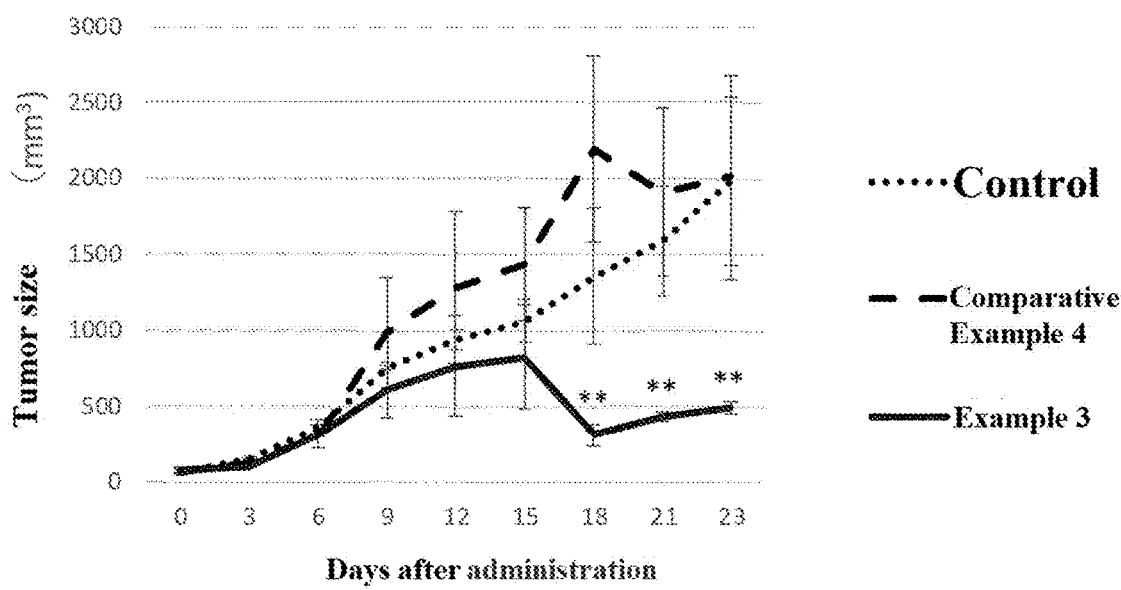
FIG. 7 is a graph illustrating the tumor size after administration of a control, Comparative Example 4, or Example 3 and the number of administration days.

FIG. 7 is a graph illustrating transitions of tumor size in the control (N=2), Comparative Example 4(N=2) and Example 3 administration group (N=2). The vertical axis represents the average value of tumor size±standard deviation (SD) and the horizontal axis represents the days after administration. Suppression of tumor proliferation was recognized as a significant difference at the level of 1% in the Example 3 administration group between days 18 and 24 compared with the control and Comparative Example 4 administration group. The tumor size day 24 grew to about 2,000 $mm^3$ in the control and Comparative Example 4 administration group. On the other hand, the tumor diminished in the size from 800 to 500 $mm^3$ in the group of the Example 3 administration day 18 and the suppression effect was confirmed to the day 24. That is, the tumors largely shrank due to not only anticancer effect of the peptide itself but also the effect of the anticancer agent. The peptides of the present invention specifically act on the target cells compared with the single administration of the anticancer agent and have high toxicity against the cancer cells. The above results also demonstrated that the peptides of the present invention were effective as the delivery carrier of the activator such as the anticancer agent.

INDUSTRIAL APPLICABILITY

The cell-penetrating peptide of the present invention has high selective toxicity and can be applied to the novel mean that is different from the conventional therapy. Also, the cell-penetrating peptide can be applied to not only pharmaceuticals but also diagnosis of the lesions, and further is expected to be used as the carrier peptide transporting the various activators into the nucleus also.

SEQUENCE LISTING

The invention claimed is:

1. An isolated cell-penetrating peptide comprising a motif selected from the group consisting of RGN, RGH, RYN, LYN, FFN and QYN and a motif selected from the group consisting of NGR and SEQ ID NOs: 44 and 45, and having a β-strand structure between the respective motifs,
wherein the cell-penetrating peptide has a full length of 30 amino acids or less, and wherein the cell-penetrating peptide has an amino acid sequence selected from the group consisting of SEQ ID NOS: 1, 34, 2, 3, 4, 5, 6, 7, 8, and 9.

2. The cell-penetrating peptide according to claim 1, wherein an agent is bound to the N-terminus and/or C-terminus of the cell-penetrating peptide.

3. The cell-penetrating peptide according to claim 2, wherein the agent is selected from the group consisting of doxorubicin, mitomycin C, vindesine, methotrexate, retinoic acid, carboplatin, nedaplatin, oxaliplatin, epirubicin, actinomycin D, gemcitabine and oteracil potassium.

4. A method of treating fibrosarcoma, sarcoma, lung cancer, pancreatic cancer, blood cancer or liver cancer in a subject comprising administering to the subject a therapeutically effective amount of the cell-penetrating peptide according to claim 1 as an active ingredient.

5. A method of treating fibrosarcoma, sarcoma, lung cancer, pancreatic cancer, blood cancer or liver cancer in a subject comprising administering to the subject a therapeutically effective amount of the cell-penetrating peptide according to claim 1, wherein an agent is bound to the N-terminus and/or C-terminus of the cell-penetrating peptide.

6. The method according to claim 5, wherein the agent is doxorubicin.

* * * * *